(12) United States Patent
Charters et al.

(10) Patent No.: US 7,811,640 B2
(45) Date of Patent: Oct. 12, 2010

(54) METHODS FOR FABRICATING POLYMER OPTICAL WAVEGUIDES ON LARGE AREA PANELS

(75) Inventors: Robert Bruce Charters, Palmerston (AU); Dax Kukulj, Kingston (AU); Ian Andrew Maxwell, Five Dock (AU); Graham Roy Atkins, Kaleen (AU)

(73) Assignee: RPO Pty Limited, Acton, ACT (AU)

( * ) Notice: Subject to any disclaimer, the term of this patent is extended or adjusted under 35 U.S.C. 154(b) by 548 days.

(21) Appl. No.: 11/742,194

(22) Filed: Apr. 30, 2007

(65) Prior Publication Data
US 2007/0258691 A1    Nov. 8, 2007

Related U.S. Application Data

(60) Provisional application No. 60/796,722, filed on May 2, 2006.

(51) Int. Cl.
*B05D 3/06* (2006.01)
(52) U.S. Cl. .................... 427/558; 385/123; 385/128; 385/130; 385/143; 385/146
(58) Field of Classification Search .............. 427/558; 385/123, 128–130, 143–146
See application file for complete search history.

(56) References Cited

U.S. PATENT DOCUMENTS

| | | | |
|---|---|---|---|
| 3,689,264 A | 9/1972 | Chandross et al. | |
| 3,809,732 A | 5/1974 | Chandross et al. | |
| 3,935,133 A | 1/1976 | Van Leuwen et al. | |
| 4,609,252 A | 9/1986 | Wong et al. | |
| 4,749,245 A | 6/1988 | Kawatski et al. | |
| 4,824,522 A | 4/1989 | Baker et al. | |
| 5,062,680 A | 11/1991 | Imamura et al. | |
| 5,230,990 A | 7/1993 | Iwasaki et al. | |
| 5,265,184 A | 11/1993 | Lebby et al. | |
| 5,292,620 A | 3/1994 | Booth et al. | |
| 5,298,288 A * | 3/1994 | Curry et al. ............... | 427/98.9 |
| 5,534,101 A | 7/1996 | Keyworth et al. | |
| 5,914,709 A | 6/1999 | Graham et al. | |
| 6,054,253 A | 4/2000 | Fardad et al. | |
| 6,181,842 B1 | 1/2001 | Francis et al. | |
| 6,191,053 B1 | 2/2001 | Chun et al. | |
| 6,238,735 B1 | 5/2001 | Mandal et al. | |
| 6,308,001 B1 | 10/2001 | Nair et al. | |

(Continued)

OTHER PUBLICATIONS

B, Lee, Fabrication of Polymeric Large-Core Waveguides . . . Molding Process, IEEE Photonics Technology Letters, vol. 12, No. 1, (2000), pp. 62-64.*

(Continued)

*Primary Examiner*—Lan Vinh
*Assistant Examiner*—Maki A Angadi
(74) *Attorney, Agent, or Firm*—Miller, Matthias & Hull

(57) ABSTRACT

This invention describes methods for fabricating polymer optical waveguides, and polymer optical waveguides themselves wherein at least one of the optical layers is deposited by a two-stage deposition process. In particular, the two-stage deposition process comprises spinning as the second step. Preferably, the polymer optical waveguide comprises a three layer structure comprising a lower cladding layer, a light guiding core layer and an upper cladding layer, supported on a substrate. The invention has particular application to the volume production of polymer optical waveguides on large area substrates.

59 Claims, 8 Drawing Sheets

U.S. PATENT DOCUMENTS

| | | |
|---|---|---|
| 6,316,589 B1 | 11/2001 | You et al. |
| 6,319,316 B1 | 11/2001 | Gibson et al. |
| 6,327,415 B1 | 12/2001 | Koyano et al. |
| 6,341,190 B1 | 1/2002 | Summersgill et al. |
| 6,351,260 B1 | 2/2002 | Graham et al. |
| 6,470,128 B1 * | 10/2002 | Khudyakov et al. ......... 385/128 |
| 6,495,205 B1 | 12/2002 | Gibson et al. |
| 6,540,833 B1 | 4/2003 | Gibson et al. |
| 6,548,115 B1 | 4/2003 | Gibson et al. |
| 6,555,288 B1 | 4/2003 | Xu et al. |
| 6,603,917 B2 | 8/2003 | Takayama et al. |
| 6,685,921 B2 | 2/2004 | Lawlor |
| 6,724,968 B2 | 4/2004 | Lackritz et al. |
| 6,727,337 B2 | 4/2004 | Friedrich |
| 6,800,724 B2 | 10/2004 | Zha et al. |
| 6,818,721 B2 | 11/2004 | Zha et al. |
| 6,901,198 B2 * | 5/2005 | Shimizu et al. ............. 385/129 |
| 6,965,006 B2 | 11/2005 | Zha |
| 7,030,039 B2 | 4/2006 | Gurer et al. |
| 7,133,592 B2 * | 11/2006 | Yasuda et al. ............... 385/145 |
| 7,295,749 B2 * | 11/2007 | Kitamura et al. ............ 385/141 |
| 2001/0031269 A1 | 10/2001 | Arnaud |
| 2004/0037531 A1* | 2/2004 | Andrews et al. ............ 385/130 |
| 2004/0209784 A1 | 10/2004 | Hardman et al. |
| 2005/0002629 A1* | 1/2005 | Okamoto et al. ............ 385/129 |
| 2005/0089298 A1 | 4/2005 | Maxwell et al. |
| 2006/0240269 A1* | 10/2006 | Aoi et al. .................... 428/447 |
| 2007/0190331 A1 | 8/2007 | Charters et al. |

OTHER PUBLICATIONS

Makoto Hikita et al. IEEE Jounral of Selected Topics in Quantum Electronics, vol. 5, No. 5, Sep./Oct. (1999), pp. 1237-1242.*

U.S. Appl. No. 11/742,224, filed Apr. 30, 2007, Charters et al.

U.S. Appl. No. 11/742,887, filed May 1, 2007, Kukulj et al.

NTT, M Kawachi, "Recent Progress in Silica-Based Planar Lightwave Circuits on Silicon", *IEE Proc. Optoelectronics*, vol. 143(5), pp. 257-262, 1996.

AT&T Bell Labs, Y P Li and C H Henry, "Silica-Based Optical Integrated Circuits", *IEE Proc Optoelectronics*, vol. 143(5), pp. 263-280, 1996.

C F Kane and R.R Krchnavek, "Benzocyclobutene Optical Waveguides", *IEE Photon Technol. Lett.* 7, 535-537, 1995.

L Eldada and L W Shacklette, "Advances in Polymer Integrated Optics", *IEE Journal of Selected Topics in Quantum Electronics*, vol. 6, pp. 54-68, 2000.

W A McDonald, "Engineered Films for Display Technologies", *Journal of Materials Chemistry*, vol. 14, pp. 4-10, 2004.

* cited by examiner

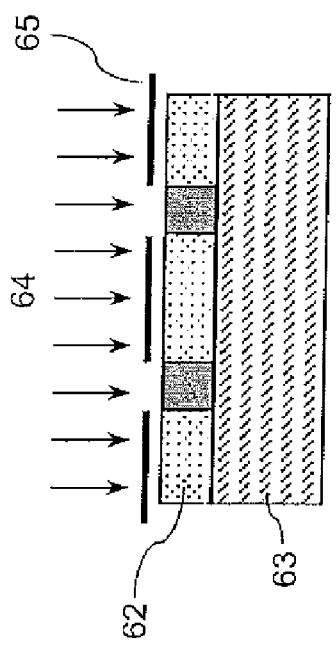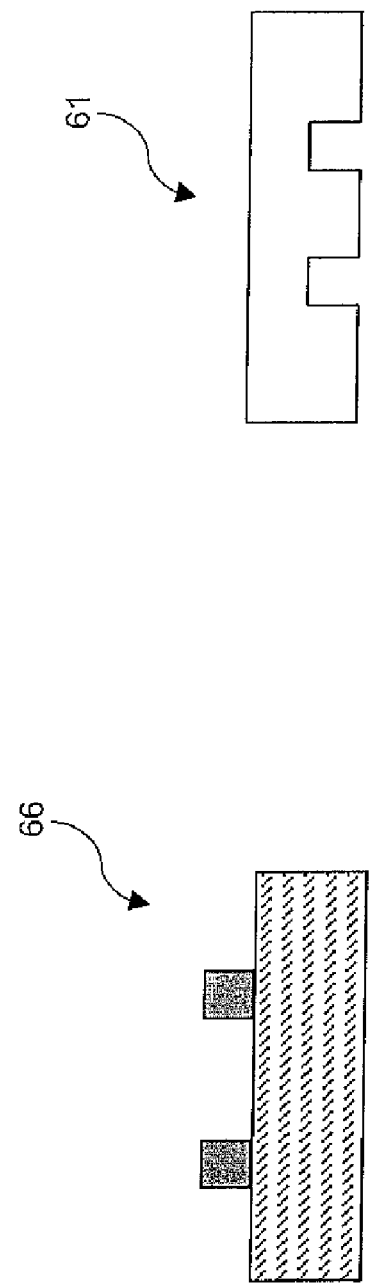

US 7,811,640 B2

METHODS FOR FABRICATING POLYMER OPTICAL WAVEGUIDES ON LARGE AREA PANELS

CROSS-REFERENCE TO RELATED APPLICATION

This application is a non-provisional claiming priority under 35 USC §119(e) to U.S. provisional application Ser. No. 60/796,722 filed on May 1, 2006.

INTRODUCTION

This invention relates to methods for the mass production of integrated optical waveguides composed of polymer materials, and particularly to those methods suitable for the formation of waveguides on large area substrates.

BACKGROUND ART

Integrated optical waveguides are well known in the art, and typically comprise a patterned, light guiding core layer (of refractive index $n_1$) surrounded by a cladding material (of refractive index $n_2$, where $n_2 < n_1$) and mounted on a suitable substrate. Light propagating along the waveguide is guided within the core by the refractive index difference between core and cladding.

FIGS. 1a and 1b show side and end views of a typical integrated optical waveguide 10, comprising a substrate 11, a lower cladding layer 12, a light guiding core 13 and an upper cladding layer 14. Depending on the material system, a variety of techniques are available for depositing the lower cladding, core and upper cladding layers. These include flame hydrolysis, chemical vapour deposition and physical vapour deposition (eg. for glass), molecular beam epitaxy (eg. for semiconductors) and spin coating, spray coating and roller coating (eg. for polymers). A core layer may be patterned for example by photolithography and reactive ion etching (suitable for most materials) or by photolithography and wet etching (eg. for photo-patternable polymers), exploiting a solubility differential between exposed and unexposed material.

Irrespective of the method used to fabricate an integrated optical waveguide, the refractive index of the lower 12 and upper 14 cladding layers needs to be less than that of the core 13, so that light is confined within the core. Often, the lower 12 and upper 14 cladding layers have the same refractive index, so that the core-guided mode is symmetric, although this is not essential. If the substrate material is transparent and has refractive index lower than the core material, the lower cladding 12 may be omitted. Typically, waveguides have a light transmissive elongated core region that is square or rectangular in cross section, as illustrated in FIG. 1. The bottom face is conventionally defined as that being adjacent or nearest the substrate, the top face as the face parallel to the bottom face but furthest from the substrate, and the sides as those faces that are perpendicular to the substrate.

Much of the early developmental work on integrated optical waveguides, notably at NTT (M. Kawachi, "Recent progress in silica-based planar lightwave circuits on silicon", *IEE Proc Optoelectronics* vol. 143(5), pp 257-262, 1996) and AT&T Bell Labs (Y. P. Li and C. H. Henry, "Silica-based optical integrated circuits", *IEE Proc Optoelectronics* vol. 143(5), pp. 263-280, 1996) was aimed at producing devices for optical telecommunications networks, operating mostly at 1.55 μm. For compatibility with the silicate optical fibres that formed the network backbone, the integrated optical waveguides were generally likewise composed of silicate glass, often on silicon substrates. This material system is often known in the art as "silica on silicon", and has been applied to a number of telecommunications devices including 1×2 switches, 1×N splitters, M×N star couplets and arrayed waveguide gratings (AWGs). A disadvantage with silica-based waveguides is the large capital cost of the fabrication process, requiring for example flame hydrolysis or chemical vapour deposition for depositing the various layers, and photoresist patterning followed by reactive ion etching for patterning the core layer.

Alternative waveguide material systems have been explored for telecommunications devices, including silicon-on-insulator and highly fluorinated polymers. Optical polymers are a particularly favourable material system if they are photo-patternable, because the capital cost of the fabrication plant is considerably less than required for silicate (or silicon) waveguides. Several methods for the fabrication of optical waveguides from photo-patternable polymers are known in the art. One such method, which may be described as a 'UV lithography/wet etch' method and disclosed for example in U.S. Pat. No. 4,609,252, U.S. Pat. No. 6,054,253 and U.S. Pat. No. 6,555,288, involves deposition of a layer of photocurable liquid polymer or polymer solution onto a substrate, followed by image-wise exposure of the photo-curable polymer to actinic radiation, usually ultraviolet (UV) light. The patterned polymer layer is then flushed with a developing solvent, exploiting a solubility differential between exposed and unexposed material. With photo-curable polymers, the exposed material is generally less soluble than the unexposed material, and is left behind by the solvent, similar to well known "negative tone" photoresist. Alternatively, the exposure may cause the material to be more soluble, in which case the unexposed material is left behind (similar to "positive tone" photoresist). Apart from UV light, several types of actinic radiation suitable for curing photo-curable polymers are known in the art, including X-rays, visible light and electron beams. Several techniques for depositing the polymer material are known in the art, with spin coating generally considered to be the method of choice for depositing optical quality polymer layers. The image-wise exposure can be performed with light either through a mask, eg. in a mask aligner or stepper, or by a laser direct writing procedure; exposure through a mask is generally preferred for high fabrication throughput. A general "negative tone" procedure for fabricating an optical waveguide from UV-patternable polymers is illustrated in FIGS. 2a to 2d. As shown in FIG. 2a, a low refractive index UV-curable polymer is spin coated onto substrate 20 and blanket exposed to UV light to form a lower cladding layer 21. As shown in FIG. 2b, a high refractive index UV-curable polymer is spin coated onto lower cladding layer 21, then image-wise exposed to UV light 22 through a mask 23 to produce a region of UV-exposed material 24 and a region of unexposed material 25. FIG. 2c shows a core 26 comprised of UV-exposed material 24, after the unexposed material 25 has been removed with a solvent, in a step commonly known as "wet development" or "wet etching". Finally, FIG. 2d shows an upper cladding layer 27 formed by spin coating and blanket UV exposure of another low refractive index UV-curable polymer.

In a variation on this process that may be applicable for polymers deposited from solution, disclosed for example in U.S. Pat. No. 3,689,264 and U.S. Pat. No. 3,809,732, the imagewise UV exposure produces the necessary refractive index change (positive or negative) to differentiate the core region from the cladding region, so that a wet development stage is not required. Alternatively, a polymer core layer may be patterned by a moulding or embossing process, as disclosed in U.S. Pat. No. 5,230,990 and U.S. Pat. No. 5,265,184 for example, where waveguides can be produced repeatedly once a master or mould has been obtained. Photo-curable polymers are particularly suitable in this case, because they can be cured (ie. solidified) during the moulding or embossing process. In yet another alternative, a curable polymer core layer may be deposited as required by a direct dispense and cure process, as disclosed in U.S. Pat. No. 5,534,101 for example. Other methods for fabricating integrated optical waveguides from polymer materials will be known to those skilled in the art.

In another variation, the polymer materials may be thermally curable rather than photo-curable. A thermally curable polymer layer may be blanket cured by heat, or patterned in an analogous manner to a photo-curable polymer using a spatially selective source of heat such as an infrared laser, followed by wet development if required. In general, photo-curable polymers are preferred to thermally curable polymers, because the short wavelength of the curing light (usually UV) enables superior spatial precision in the patterning process. Photo-curable polymers also tend to have superior shelf life.

The term polymer as used herein refers to a substantially organic molecule of high relative molecular mass, the structure of which comprises portions having multiple repetitions of units derived actually or conceptually from molecules of low relative molecular mass. Most polymers are composed of repeating carbon-based units, although siloxanes (also known as silicones), composed of a repeating Si—O backbone or network with carbon-based groups attached to the silicon atoms, are also considered to be polymers. For the purposes of this specification, a curable polymer comprises molecules (monomers, oligomers or macromolecules) capable of entering, through reactive groups, into polymerisation or further polymerisation, thereby contributing more than one monomeric unit to the final polymer.

Integrated optical waveguides have many potential applications besides telecommunications devices. One such application is optical backplanes for high speed computers. Another is in waveguide-based optical touch screen sensors described in U.S. Pat. No. 5,914,709, U.S. Pat. No. 6,181,842 and U.S. Pat. No. 6,351,260, which may be employed in a variety of consumer electronics devices including hand-held games, mobile phones, computers and personal digital assistants (PDAs). The potential markets for such devices are huge, and if optical waveguides are to be used in them, it is essential that methods be found to mass-produce them in a cost-effective manner.

It will be appreciated by those skilled in the art that photo-patternable polymers ale attractive as low cost waveguide materials. Firstly, as explained above, the capital cost of the fabrication plant is low. Secondly, there are cost reductions associated with higher throughput, since most polymer waveguide fabrication methods, such as the photolithography/wet etch procedure shown in FIGS. 2a to 2d, take considerably less time than procedures for fabricating silica-on-silicon waveguides (chemical vapour or flame hydrolysis deposition of the silica material; photoresist deposition, patterning and development; and reactive ion etching of the silica material). In a further cost advantage, polymers are relatively inexpensive waveguide materials. It is important to note that if there is no necessity to operate in the 1.55 µm telecommunications window, there is no need for expensive highly fluorinated polymers (eg. as disclosed in U.S. Pat. No. 6,308,001 and U.S. Pat. No. 6,555,288) that have been developed for low optical loss telecommunications devices. Instead, the optics in consumer electronics devices can be designed to operate at wavelengths where standard hydrocarbon polymers have minimal optical absorption, in particular in the near IR region below 1 µm.

For the purposes of this specification, the thickness uniformity of a layer is defined in a relative manner, as (standard deviation in thickness/average thickness)*100%.

Although photo-patternable polymers are attractive as low cost waveguide materials, there remains a need for reliable and reproducible methods for scaling up the fabrication of optical waveguides for high volume applications such as optical backplanes and consumer electronics devices.

SUMMARY OF THE INVENTION

In broad aspect, the invention provides methods for fabricating a polymer optical waveguide wherein at least one of the optical layers is applied by a two-stage deposition process, followed by curing. Preferably, the polymer optical waveguide comprises a three layer structure comprising a lower cladding layer, a light guiding core layer and an upper cladding layer, supported on a substrate.

According to a first aspect the invention provides a method of fabricating a polymer optical waveguide, said method comprising the steps of:

applying to a substrate a first curable polymer material;

spinning said substrate to obtain a layer of said first curable polymer material with substantially uniform thickness; and processing said layer to produce a light guiding core, said processing step including curing said first curable polymer material, wherein said material is applied to said substrate by a process selected from the group comprising extrusion coating, slot coating, roller coating, meniscus coating, spray coating, curtain coating and doctor blading.

Preferably the processing step comprises the steps of:

image-wise exposing said layer of first curable polymer material to a patterned source of curing radiation, thereby defining an exposed portion of said layer and an unexposed portion of said layer; and removing said unexposed portion with a solvent.

Alternatively, the processing step comprises the steps of:

applying a mould to said layer of first curable polymer material;

exposing said material to curing radiation; and removing said mould.

In one specific embodiment of the first aspect, the invention provides a method of fabricating a polymer optical waveguide, said method comprising the steps of:
  (i) applying to a substrate a first curable polymer material;
  (ii) spinning said substrate to obtain a layer of said first curable polymer material with substantially uniform thickness;
  (iii) image-wise exposing said layer of first curable polymer material to a patterned source of curing radiation, thereby defining an exposed portion of said layer of first curable polymer material and an unexposed portion of said layer of first curable polymer material; and
  (iv) removing said unexposed portion with a solvent, wherein said exposed portion forms the polymer optical waveguide, and wherein the first curable polymer material is applied to the substrate by a process selected from a group comprising extrusion coating, slot coating, roller coating, meniscus coating, splay coating, curtain coating and doctor blading.

Preferably the first curable polymer material is applied to the substrate by extrusion coating. Preferably the first curable polymer material is selected from the group comprising a hydrocarbon polymer and a siloxane polymer. The first curable polymer material is curable by means selected from a group comprising actinic radiation, for example UV radiation, and heat. Preferably, the first curable polymer material is substantially non-volatile and is preferably solvent-free (ie. not dissolved in or diluted with a solvent). The first curable polymer material preferably has a viscosity in the range 100-10,000 cP, more preferably in the range 500-5,000 cP, and most preferably in the range 1,000-4,000 cP.

Volatility can be determined by many parameters, but one indication of a non-volatile material is that it is free from any components boiling at less than 175° C. at 760 mmHg, preferably free from any components boiling at less than 225° C. at 760 mmHg, and most preferably free from any components boiling at less than 275° C. at 760 mmHg. Another indication of a non-volatile material is that it has a vapour pressure of less than 0.5 mmHg at 20° C., preferably less than 0.1 mmHg at 20° C., and most preferably less than 0.01 mm Hg at 20° C.

Yet another indication of a non-volatile material is that its vapour pressure exceeds 1 mmHg only when the temperature exceeds 25° C., preferably when the temperature exceeds 50° C., and most preferably when the temperature exceeds 75° C.

The layer of said first curable polymer material preferably has a thickness uniformity better than 4%, more preferably better than 2%, and even more preferably better than 0.5% Preferably the first curable polymer material, when cured, has a glass transition temperature (Tg) below an operating temperature of the polymer optical waveguide. Preferably the first curable polymer material, when cured, has a Tg below 50° C., more preferably below 25° C., and most preferably below 10° C. If the substrate has a Tg, the second curable polymer material, when cured, preferably has a Tg less than a Tg of the substrate.

In some preferred embodiments, the polymer optical waveguide forms a component of a device selected from the group comprising an optical backplane, a telecommunications system, a data communications system, and a waveguide-based optical touch screen sensor.

In one preferred embodiment, a substrate comprises a circular wafer of up to at least 300 mm in diameter or a rectangular panel, comprising a material selected from the group comprising silicon, oxidised silicon, gallium arsenide, indium phosphide, sapphire, a ceramic, a glass, a metal, a laminate such as FR-4, and a polymer.

In an alternative preferred embodiment, the substrate comprises a rectangular panel, for instance one at least about 200 mm×200 mm, and preferably at least 270 mm×300 mm in size, comprising a material selected from the group comprising a glass, a polymer and a laminate such as FR-4. In that case it is preferred that the rectangular panel comprises a polymer selected from the group comprising polycarbonate, polymethyl methacrylate, polyester, polyethylene, polyimide, polystyrene, nylon, polyvinyl chloride and polysulfone. More preferably the rectangular panel comprises a polymer selected from the group comprising a polycarbonate, a polysulfone and the polyester polyethylene terephthalate (PET). Preferably, the first curable polymer material, when cured, has a Tg less than a Tg of the rectangular panel. It is also preferred that the rectangular panel can be bent repeatedly and reversibly through 180° with a radius of curvature that is less than 100 cm, preferably less than 10 cm, more preferably less than 1 cm, and most preferably less than 2 mm.

Preferably, the method of the first aspect additionally comprises the step of applying to said substrate a lower cladding layer prior to applying said first curable polymer material, wherein said lower cladding layer has a refractive index lower than a refractive index of said polymer optical waveguide core. Preferably the lower cladding layer comprises a second curable polymer material. Preferably, the method of the first aspect additionally comprises the step of blanket curing said material after it has been applied. Said second curable polymer material is advantageously applied by a process selected from the group comprising spin coating, extrusion coating, slot coating, roller coating, meniscus coating, curtain coating, spray coating and doctor blading. Preferably, the second curable polymer material is applied by a two-stage technique comprising:

a process selected from the group comprising extrusion coating, slot coating, roller coating, meniscus coating, curtain coating, spray coating and doctor blading, followed by a spinning process.

Preferably the second curable polymer material is selected from the group comprising a hydrocarbon polymer and a siloxane polymer. The second curable polymer material is curable by means selected from the group comprising actinic radiation, for example UV radiation, and heat. Preferably the second curable polymer material is substantially non-volatile, and in particular is solvent-free. Preferably the second curable polymer material, when cured, has a Tg below 50° C., more preferably below 25° C., and most preferably below 10° C. If the substrate has a Tg, the second curable polymer material, when cured, preferably has a Tg less than a Tg of the substrate.

In one embodiment of the present invention, the lower cladding and the polymer light guiding core portion are of substantially similar but non-identical composition.

Preferably, the method of the first aspect additionally comprises the step of applying to said polymer optical waveguide an upper cladding layer, wherein said upper cladding layer has a refractive index lower than a refractive index of said polymer optical waveguide. Preferably, the upper cladding layer comprises a third curable polymer material. Preferably, the method of the first aspect additionally comprises the step of blanket curing said material after it has been applied. The third curable polymer material is preferably applied by a process selected from the group comprising spin coating, extrusion coating, slot coating, roller coating, meniscus coating, curtain coating, splay coating and doctor blading. Preferably the third curable polymer material is applied by a two-stage technique comprising:

a process selected from the group comprising extrusion coating, slot coating, roller coating, meniscus coating, curtain coating, spray coating and doctor blading, followed by a spinning process. Preferably the third curable polymer material is selected from the group comprising a hydrocarbon polymer and a siloxane polymer. The third curable polymer material is curable by means selected from the group comprising actinic radiation, for example UV radiation, and heat. The third curable polymer material is preferably substantially non-volatile, and in particular is solvent-free. Preferably the third curable polymer material, when cured, has a Tg below 50° C., more preferably below 25° C., and most preferably below 10° C. If the substrate has a Tg, the third curable polymer material, when cured, preferably has a Tg less than a Tg of the substrate. In one preferred embodiment, the upper cladding and the polymer light guiding core portion are of substantially similar but non-identical composition.

Preferably the upper cladding layer comprises a third curable polymer material, and the invention additionally comprises the step of patterning said third curable polymer material.

Preferably the upper cladding layer comprises a third curable polymer material, and the invention additionally comprises the steps of:

image-wise exposing said third curable polymer material to a patterned source of curing radiation, thereby defining an exposed portion of said third curable polymer material and an unexposed portion of said third curable polymer material; and removing said unexposed portion with a solvent. Preferably the third curable polymer material is applied by a process selected from the group comprising spin coating, extrusion coating, slot coating, roller coating, meniscus coating, curtain coating, spray coating and doctor blading. Alternatively preferably, the third curable polymer material is applied by a two-stage technique comprising:

a process selected from the group comprising extrusion coating, slot coating, roller coating, meniscus coating, curtain coating, spray coating and doctor blading, followed by a spinning process.

Preferably the third curable polymer material is selected from the group comprising a hydrocarbon polymer and a siloxane polymer. The third curable polymer material is curable by means selected from the group comprising actinic radiation, for example UV radiation, and heat. The third curable polymer material is preferably substantially non-volatile, and in particular is solvent-free. Preferably the third curable polymer material, when cured, has a Tg below 50° C., more preferably below 25° C., and most preferably below 10° C. If the substrate has a Tg, the third curable polymer material, when cured, preferably has a Tg less than a Tg of the substrate.

According to a second aspect the invention provides a method of fabricating a polymer optical waveguide, said method comprising the steps of:

applying to a substrate a second curable polymer material;

spinning said substrate to obtain a layer of said second curable polymer material with substantially uniform thickness;

blanket curing said layer to form a lower cladding layer having a second refractive index;

applying to said lower cladding layer a first curable polymer material; and processing said first curable polymer material to produce a light guiding core, said processing step including curing said first curable polymer material, wherein said core has a first refractive index higher than said second refractive index, and wherein said first and second curable polymer materials are each applied by a process selected from the group comprising extrusion coating, slot coating, roller coating, meniscus coating, spray coating, curtain coating and doctor blading.

Preferably the processing step comprises the steps of:

image-wise exposing said first curable polymer material to a patterned source of curing radiation, thereby defining an exposed portion of said material and an unexposed portion of said material; and removing said unexposed portion with a solvent.

Alternatively the processing step comprises the steps of:

applying a mould to said first curable polymer material;

exposing said material to curing radiation; and removing said mould.

In a more specific embodiment of the second aspect, the invention provides a method of fabricating a polymer optical waveguide, said method comprising the steps of:

applying to a substrate a second curable polymer material;

spinning said substrate to obtain a layer of said second curable polymer material with substantially uniform thickness;

blanket curing said layer of second curable polymer material by exposure to curing radiation to form a lower cladding layer having a second refractive index;

applying to said lower cladding layer a first curable polymer material;

image-wise exposing said first curable polymer material to a patterned source of said curing radiation, thereby defining an exposed portion of said first curable polymer material and an unexposed portion of said first curable polymer material; and removing said unexposed portion with a solvent, wherein said exposed portion forms the polymer optical waveguide having a first refractive index, higher than said second refractive index, and wherein the first and second curable polymer materials are each applied by a process selected from the group comprising extrusion coating, slot coating, roller coating, meniscus coating, spray coating, curtain coating and doctor blading.

Preferably at least one of the first and second curable polymer materials is applied by extrusion coating. Preferably the curing radiation is by UV radiation. Preferably the method of the second aspect additionally comprises the step of applying to said polymer optical waveguide an upper cladding layer, wherein said upper cladding layer has a refractive index lower than said first refractive index. Preferably the upper cladding layer comprises a third curable polymer material. Preferably, the method of the second aspect additionally comprises the step of blanket curing said material with curing radiation, preferably UV radiation, after it has been applied. In one preferred embodiment, the third curable polymer material is applied by a process selected from the group comprising spin coating, extrusion coating, slot coating, roller coating, meniscus coating, curtain coating, spray coating and doctor blading. In an alternative preferred embodiment the third curable polymer material is applied by a two-stage technique comprising:

a process selected from the group comprising extrusion coating, slot coating, roller coating, meniscus coating, curtain coating, spray coating and doctor blading, followed by a spinning process.

According to a third aspect the invention provides a method of fabricating a polymer optical waveguide, said method comprising the steps of:

applying to a substrate a second curable polymer material;

spinning said substrate to obtain a layer of said second curable polymer material with substantially uniform thickness;

blanket curing said layer to form a lower cladding layer having a second refractive index;

applying to said lower cladding layer a first curable polymer material;

spinning said substrate to obtain a layer of said first curable polymer material with substantially uniform thickness; and processing said layer of first curable polymer material to produce a light guiding core, said processing step including curing said first curable polymer material, wherein said core has a first refractive index, higher than said second refractive index, and wherein the first and second curable polymer materials are each applied by a process selected from the group comprising extrusion coating, slot coating, roller coating, meniscus coating, spray coating, curtain coating and doctor blading.

Preferably the processing step comprises the steps of:

image-wise exposing said layer of first curable polymer material to a patterned source of curing radiation, thereby defining an exposed portion of said layer and an unexposed portion of said layer; and removing said unexposed portion with a solvent.

Alternatively the processing step comprises the steps of:

applying a mould to said layer of first curable polymer material;

exposing said material to curing radiation; and removing said mould.

In a specific embodiment of the third aspect, the invention provides a method of fabricating a polymer optical waveguide, said method comprising the steps of:

(i) applying to a substrate a second curable polymer material;

(ii) spinning said substrate to obtain a layer of said second curable polymer material with substantially uniform thickness;

(iii) blanket curing said layer of second curable polymer material by exposure to curing radiation to form a lower cladding layer having a second refractive index;

(iv) applying to said lower cladding layer a first curable polymer material;

(v) spinning said substrate to obtain a layer of said first curable polymer material with substantially uniform thickness;

(vi) image-wise exposing said layer of first curable polymer material to a patterned source of said curing radiation, thereby defining an exposed portion of said layer of first curable polymer material and an unexposed portion of said layer of first curable polymer material; and (vii) removing said unexposed portion with a solvent, wherein said exposed portion forms the polymer optical waveguide having a first refractive index, higher than said second refractive index, and wherein the first and second curable polymer materials are each applied by a process selected from the group comprising extrusion coating, slot coating, roller coating, meniscus coating, splay coating, curtain coating and doctor blading.

Preferably at least one of the first and second curable polymer materials is applied by extrusion coating. Preferably the curing radiation is UV radiation.

Preferably the method of the third aspect additionally comprises the step of applying to said polymer optical waveguide an upper cladding layer, wherein said upper cladding layer has a refractive index lower than said first refractive index.

Preferably the upper cladding layer comprises a third curable polymer material, and the method additionally comprises the step of blanket curing said material with curing radiation, preferably UV radiation, after it has been applied.

In one preferred embodiment, the third curable polymer material is applied by a process selected from the group comprising spin coating, extrusion coating, slot coating, roller coating, meniscus coating, curtain coating, spray coating and doctor blading. In an alternative preferred embodiment the third curable polymer material is applied by a two-stage technique comprising:

a process selected from the group comprising extrusion coating, slot coating, roller coating, meniscus coating, curtain coating, spray coating and doctor blading, followed by a spinning process.

According to a fourth aspect the invention provides a method of fabricating a polymer optical waveguide, said method comprising the steps of:

applying to a substrate a second curable polymer material;

blanket curing said second curable polymer material to form a lower cladding layer having a second refractive index;

applying to said lower cladding layer a first curable polymer material;

processing said first curable polymer material to produce a light guiding core, said processing step including curing said first curable polymer material, wherein said core has a first refractive index higher than said second refractive index;

applying to said polymer optical waveguide a third curable polymer material;

spinning said substrate to obtain a layer of said third curable polymer material with substantially uniform thickness; and blanket curing said layer of third curable polymer material to form an upper cladding layer having a third refractive index, lower than said first refractive index;

wherein the first, second and third curable polymer materials are each applied by a process selected from the group comprising extrusion coating, slot coating, roller coating, meniscus coating, spray coating, curtain coating and doctor blading.

Preferably, the processing step comprises the steps of:

image-wise exposing said first curable polymer material to a patterned source of curing radiation, thereby defining an exposed portion of said material and an unexposed portion of said material; and removing said unexposed portion with a solvent.

Alternatively the processing step comprises the steps of:

applying a mould to said first curable polymer material;

exposing said material to curing radiation; and removing said mould.

In a specific embodiment of the fourth aspect, the invention provides a method of fabricating a polymer optical waveguide, said method comprising the steps of:

(i) applying to a substrate a second curable polymer material;

(ii) blanket curing said second curable polymer material by exposure to curing radiation to form a lower cladding layer having a second refractive index;

(iii) applying to said lower cladding layer a first curable polymer material;

(iv) image-wise exposing said first curable polymer material to a patterned source of said curing radiation, thereby defining an exposed portion of said first curable polymer material and an unexposed portion of said first curable polymer material;

(v) removing said unexposed portion with a solvent, wherein said exposed portion forms the polymer optical waveguide having a first refractive index, higher than said second refractive index;

(vi) applying to said polymer optical waveguide a third curable polymer material;

(vii) spinning said substrate to obtain a layer of said third curable polymer material with substantially uniform thickness; and (viii) blanket curing said layer of third curable polymer material by exposure to curing radiation to form an upper cladding layer having a third refractive index, lower than said first refractive index;

wherein the first, second and third curable polymer materials are each applied by a process selected from the group comprising extrusion coating, slot coating, roller coating, meniscus coating, spray coating, curtain coating and doctor blading.

Preferably at least one of the first, second and third curable polymer materials is applied by extrusion coating. Preferably the curing radiation is UV radiation.

DESCRIPTION OF FIGURES

The invention will now be described, by way of example only, with reference to the accompanying drawings in which:

FIGS. 6a to 6c illustrate a method for producing a re-usable mould;

DETAILED DESCRIPTION OF THE INVENTION

Figure 1A:
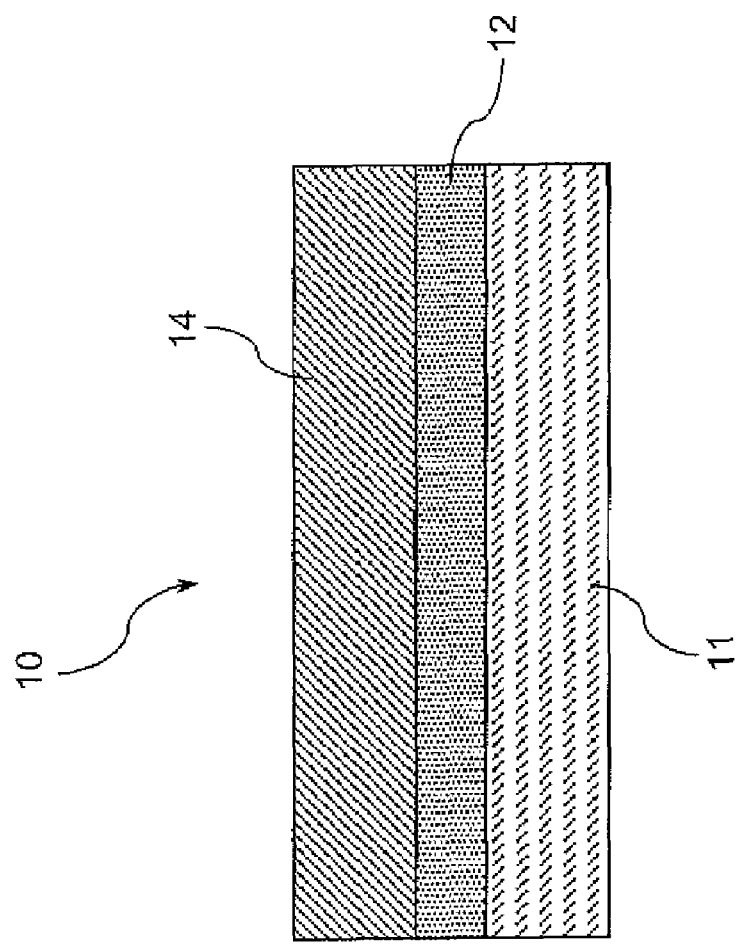
FIGS. 1a and 1b show side and end views of a typical prior art integrated optical waveguide.
Figure 1B:
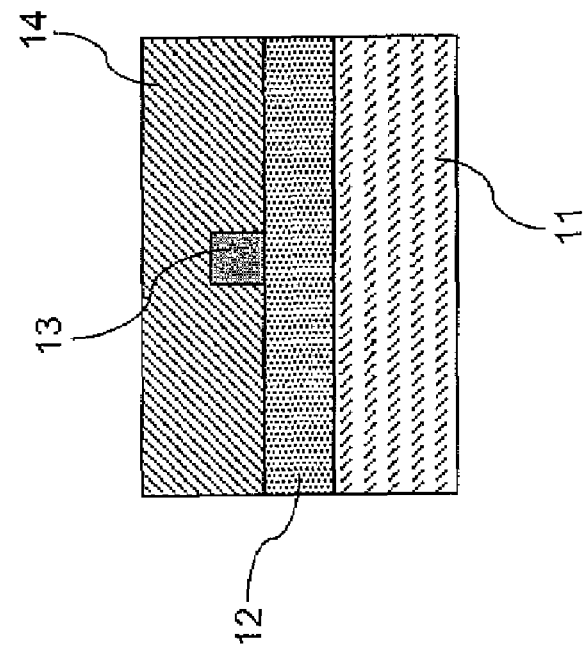
Figure 2B:
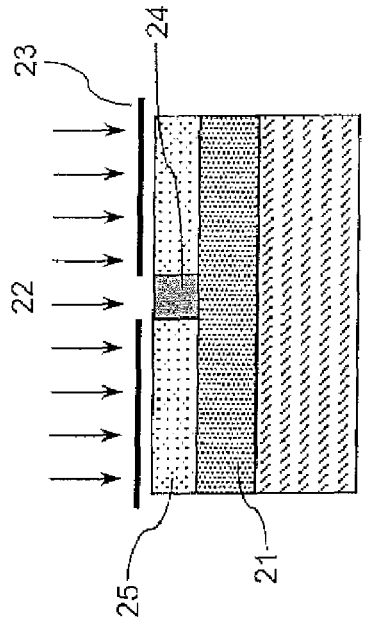
FIGS. 2a to 2d illustrate a method for fabricating an optical waveguide including patterning of a photo-curable polymer layer via photolithography and wet etching.
Figure 2D:
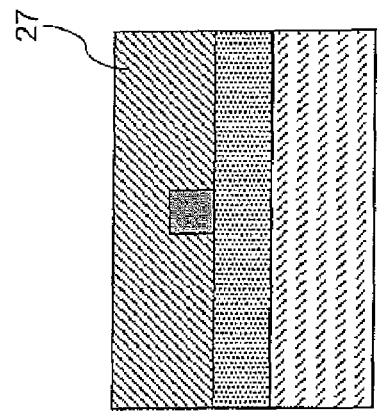
Figure 2A:
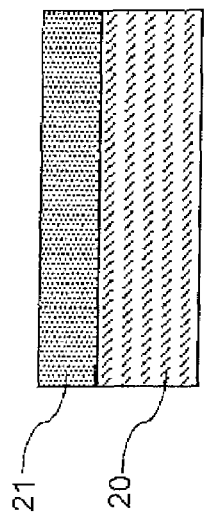
Figure 2C:
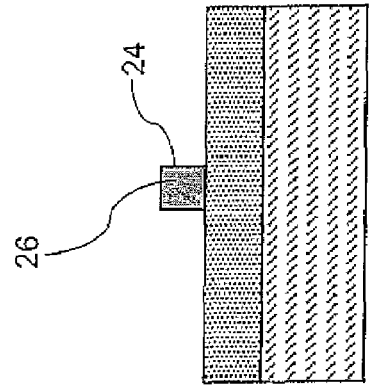

This present invention is described with reference to the fabrication of integrated optical waveguide arrays for waveguide-based optical touch screen sensors, although it will be appreciated by those skilled in the art that the inventive methods described herein we also applicable to waveguide fabrication for other purposes, and to other devices where large, flat polymeric layered constructs are required, particularly in high volume.

With photo-patternable polymers considered to be the material system of choice for the fabrication of integrated optical waveguides in a low cost manner, the present invention seeks to address the problem of mass-production of polymer waveguides. The present invention relates to methods for scaling up the fabrication process, ie. for producing mole waveguide devices per substrate, in a cost effective manner, and to the properties the polymer materials need to have to be suitable for these methods.

Broadly speaking, polymer waveguides may be fabricated by either a "batch" process, such as the photolithography/wet etch process described above in relation to FIGS. 2a to 2d, or a "continuous" reel-to-reel process disclosed for example by Dupont (U.S. Pat. No. 5,292,620), Epigem (U.S. Pat. No. 6,341,190) or Gemfire (U.S. Pat. No. 6,724,968). Although reel-to-reel processes appear at first glance to be superior to batch processes in terms of fabrication throughput, they are notoriously difficult to control, and to our knowledge no polymer waveguide manufacturer has yet made a major impact on the market with waveguides fabricated via a continuous process. Hereinafter, this specification will only consider "batch" processes for polymer waveguide fabrication.

Irrespective of the material system and methods used to fabricate optical waveguides, it is advantageous to use substrates that are as large as possible, since (within reasonable limits) more waveguide devices can be produced per substrate within a similar processing time. A wide range of substrate materials have been used for optical waveguide fabrication, most commonly silicon, oxidised silicon, glass or polymer, but also including gallium arsenide, indium phosphide, sapphire and ceramics. The substrates are often circular, of sizes up to 300 mm in diameter, but differently shaped substrates, in particular rectangular substrates, are also known in the art. Rectangular substrates, typically composed of glass or polymer, are routinely used in the flat panel display industry, which has a continually expanding range of standard substrates sizes, starting with Generation 1 (270 mm×300 mm), and it is clear that even the smallest of such substrates has greater area than the largest available circular substrates. Rectangular substrates (also known as "flat panels") may be further preferred over circular substrates on the basis of improved packing efficiency, since many waveguide devices are roughly rectangular in plan view.

Fabrication of polymer waveguides via a photolithography/wet etch process as shown in FIGS. 2a to 2d requires the deposition of thin layers of polymer material, generally of order 10 μm thick. The layers should be of "optical quality", meaning they should be microscopically smooth and of high thickness uniformity (typically 0.5% or less variation), to minimise optical loss from scattering. Several techniques for depositing polymer layers are known in the art including spin coating, dip coating, roller coating, meniscus coating, extrusion coating, spray coating, screen printing, slot coating, curtain coating and doctor blading. As a rule, these techniques are applicable to both circular and rectangular substrates, even the inherently radial spin coating process, which is widely considered to be the method of choice for depositing optical quality layers. All of these techniques require the polymer to be in liquid form. Most optical polymers known in the art tend to be high molecular weight polymers that are solids or highly viscous liquids, and to facilitate deposition it is necessary to dissolve or dilute them in a solvent.

In the spin coating process, a pool of material is dispensed onto the centre of a substrate, which is then spun at high speed (typically 1000 rpm or more) to spread the material into a smooth, thin layer on the substrate. In a common variation, the substrate is initially spun at low speed to spread the dispensed material, then the speed is increased to improve uniformity and produce a thin, highly uniform layer. For successful spin coating, it is vital that the rheology of the liquid be well controlled. The liquid needs to be sufficiently flowable to be applied, but viscous enough to provide appropriate surface coverage. Conventional liquids for spin coating employ solvents to control rheology, and to minimise changes in the rheology of the polymer solution during the coating process as the solvent evaporates, it is preferable for any solvent to have low volatility. Changes in solution rheology during coating can lead to poor quality layers. Also, a "soft bake" step to remove residual low volatility solvent is usually necessary prior to any subsequent processing steps. A further problem with solvent-containing polymers is that if polymer substrates are to be used, one must be mindful of whether the substrate will be attacked by the solvent. Although some polymer substrate materials such as polyimide, PEN and PET are known to have good solvent resistance, others such as polycarbonate, acrylate and polystyrene do not.

A known problem with spin coating, discussed for example in U.S. Pat. No. 6,191,053, is that it is extremely wasteful of material, with as much as 90-95% of the liquid dispensed onto the substrate being spun off, and only 5-10% remaining as the deposited film. Although it is possible to collect and recycle this material, this is generally a difficult and time consuming procedure. Further, for applications where high purity is essential, material recycling may be impractical because of the contamination risk. This is especially important in the case of optical waveguide manufacture, where particulate impurities must be minimised to reduce scattering loss.

The wastage of polymer material represents a major expense that becomes increasingly unacceptable as the substrate size increases, particularly for the manufacture of devices for consumer electronics devices. Accordingly if large area rectangular substrates are to be used, a less wasteful deposition technique that does not compromise film quality is particularly desirable. Techniques such as extrusion coating, slot coating, roller coating, meniscus coating, spray coating, curtain coating and doctor blading all have significantly less material wastage than spin coating, and in particular, extrusion coating (where material is extruded through a nozzle or a slot onto a substrate) has been shown to yield reasonably good quality polymer films. Some manufacturers have claimed ±2% thickness uniformity for extrusion coating (U.S. Pat. No. 6,495,205 and U.S. Pat. No. 6,548,115), but this does not meet the thickness uniformity required for optical waveguides, which is typically around ±0.5% for most applications, but in any case is certainly less than ±1%.

Figure 3:
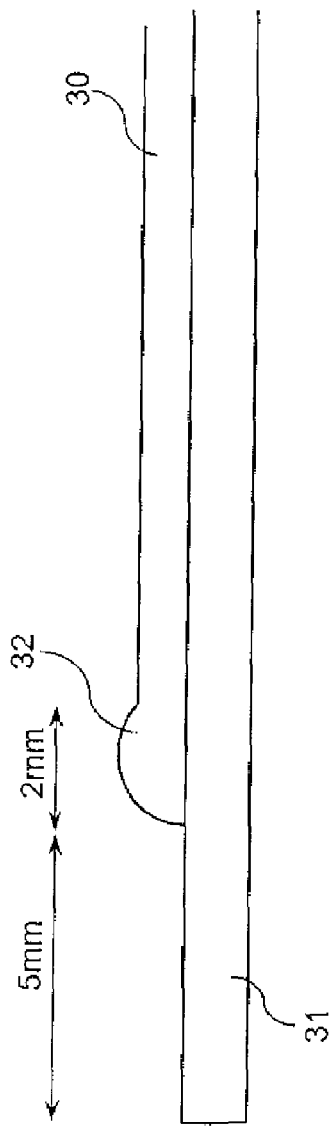
FIG. 3 shows a cross-sectional side view of a polymer layer deposited onto a substrate by extrusion coating, in the vicinity of the substrate edge.

Although extrusion coating is much less wasteful of material than spin coating, it has the disadvantage of being relatively less efficient in its utilisation of available substrate area. As shown in FIG. 3, an extrusion coater will typically only deposit material 30 to within 5 mm of the edge of a substrate 31, and the edge bead 32 on the deposited material may extend in a further 2 mm. Clearly this is a less than optimal use of the available substrate area: if the substrate were a Generation 1 flat panel for example, the usable area of deposited material 30 would be 263 mm×293 mm (ie. 77,059 mm$^2$), or 95.1% of the available substrate area. The problem is exacerbated if multiple layers have to be deposited, since each subsequent layer can only be deposited accurately on the usable area of the underlying layer. In the case of polymer optical waveguide fabrication for example, where a lower cladding layer is extrusion coated onto a Generation 1 substrate, followed by extrusion coating of a core layer, the usable (ie. patternable) area of the core layer will be 256 mm×286 mm (ie. 73,216 mm$^2$) or 90.4% of the available substrate area. The result is fewer waveguide devices per substrate, with obvious implications for the output of a fabrication plant.

Figure 4:
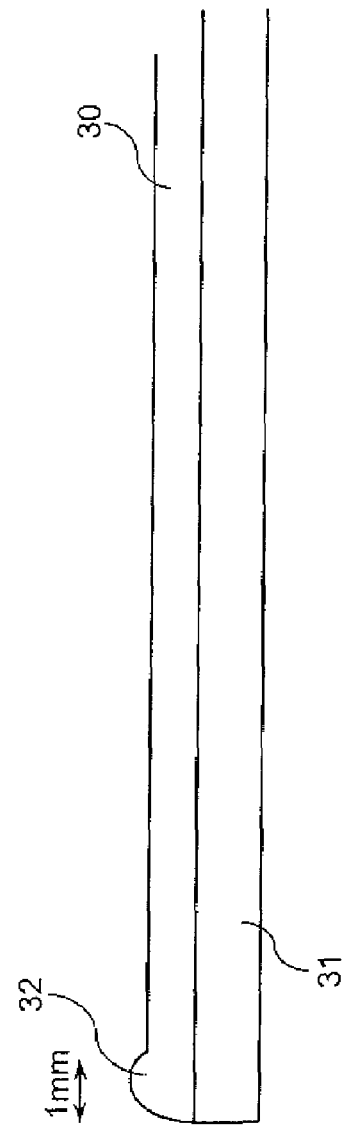
FIG. 4 shows a cross-sectional side view of a polymer layer deposited onto a substrate by spin coating, in the vicinity of the substrate edge.

In contrast, as shown in FIG. 4, a spin coater deposits material 30 right to the edge of a substrate 31, with an edge bead 32 that may only extend 1 mm in from the edge. In this case, a lower cladding layer/core layer sequence on a Generation 1 substrate will utilise 268 mm×298 mm (ie. 79,864 mm$^2$) or 98.6% of the available area.

As described in our co-pending U.S. patent application entitled "Low volatility polymers for two-stage deposition processes", Ser. No. 11/742,224 filed on even date and incorporated herein by reference in its entirety, the level of uniformity required for optical layers may be obtained with a two-stage deposition process, where a low wastage method such as extrusion coating may firstly be used to deposit a polymer layer, followed by a spinning step to improve the uniformity of the layer. It will be appreciated that the spinning step also increases the usable area of the substrate, as explained above with regard to FIGS. 3 and 4. Hereinafter, a two-stage deposition process will be referred to as an "extrude-and-spin" process, although it should be understood that some other (preferably low wastage) method such as slot coating, roller coating, meniscus coating, spray coating, curtain coating or doctor blading could be used in the first stage, followed by spinning as the second stage. When fabricating a polymer optical waveguide, any or all of the lower cladding, core and upper cladding layers may, if present, be deposited by the "extrude and spin" deposition process of the present invention.

Unlike in conventional spin coating where spinning can begin as soon as (or a predefined time after) the material is dispensed, with extrude-and-spin there can often be a considerable time lag between the first stage extrusion process and the second stage spinning process. An additional time delay is incurred if the extrusion and spinning steps are carried out on different instruments so that the substrate has to be transferred between them. Furthermore the extrusion process takes a significant time, in that material deposited at the beginning of the process resides on the substrate for a longer time than the material deposited at the end. Because of this delay between extrusion and spinning, it is very difficult to accurately and reliably control the layer quality when a solvent-containing polymer material is used in the process, a problem that is exacerbated in the case of coating large panels. Not only does the long delay result in solvent evaporation, but the variable nature of the delay causes changes in the fluid rheology, and therefore inconsistencies in the final layer properties. The majority of known polymer waveguide materials that are deposited from the liquid phase, including polymethyl methacrylate and poly(α-methylstyrene) (U.S. Pat. No. 4,749,245), polydiacetylenes (U.S. Pat. No. 4,824,522), polyacrylates and polysiloxanes (U.S. Pat. No. 5,062,680), polyimides (U.S. Pat. No. 6,316,589), poly(methyl methacrylimide) (U.S. Pat. No. 6,327,415), benzocyclobutene (C. F. Kane and R. R. Krchnavek, "Benzocyclobutene optical waveguides", *IEEE Photon Technol Lett* 7, 535-537, 1995) and highly fluorinated polymers such as TEFLON®, CYTOP® and HYFLON® (U.S. Pat. No. 6,603,917), need to be dissolved in a solvent for processing. Such solvent-based polymer systems would all be expected to cause problems when applied using a two-stage deposition process. To prevent such problems, practitioners using conventional solvent-based materials for extrude-and-spin deposition, or for spin coating in general, often must resort to elaborate means such as controlled atmosphere housings with careful control of solvent vapour concentration (U.S. Pat. No. 6,238,735; U.S. Pat. No. 7,030,039).

Solvent-free polymers are therefore highly desirable for deposition of high quality polymer layers, in particular for the fabrication of polymer optical waveguides. A solvent-free polymer is one which has not had its rheological properties adjusted by the addition of a solvent. However, in some cases, monomers, oligomers or low molecular weight polymers, which may or may not be ultimately incorporated into the cured polymer, can be volatile and lead to the same problems as seen when solvents are used. Accordingly, it is preferable to use a curable polymer composition that is non-volatile, or substantially non-volatile.

The term "substantially non-volatile" as used herein means that the polymer and/or pre-polymer has inherent physical properties that keep it in liquid or flowable form, in a determined viscosity range, throughout the deposition process, up until curing. In particular, the polymer and/or pre-polymer does not contain any added component which is volatile under the temperature, pressure and other processing conditions employed. For example, the polymer and/or pre-polymer is not converted to liquid form, nor is its viscosity adjusted, by the addition of a conventional liquefying agent such as a solvent that does not become incorporated into or remain in the final polymer waveguide material. Further, the polymer and/or pre-polymer does not contain polymerisable, copolymerisable and/or curable components such as a low molecular weight monomer that is volatile under the temperature, pressure and other processing conditions employed. To elaborate, by way of example, the addition of cyclohexanone to a curable polymer system to reduce viscosity and hence assist processing, would not result in a substantially non-volatile system.

There are several criteria by which a liquid material may be regarded as being "substantially non-volatile". Some criteria may involve the concepts of boiling point (at a specified pressure) or vapour pressure (at a specified temperature). Another criterion may concern the amount of weight of material lost per unit surface area in a specified period of time at a specified temperature and pressure. For the purposes of this invention, the volatility of a liquid material will be defined according to three criteria: boiling point at 760 mmHg pressure (ie. 1 atm); vapour pressure at 20° C.; and the temperature at which the vapour pressure exceeds 1 mmHg. Note that boiling point and vapour pressure are related—at a given pressure (say 760 mmHg), a liquid will boil when its vapour pressure reaches that pressure. Generally, boiling point is the simplest criterion for comparing the volatility of different liquids, because it is readily observable unless the liquid decomposes before boiling. The boiling point of a liquid will usually be listed amongst its physical properties. Comparisons on the basis of vapour pressure can be more difficult because vapour pressure data may not always be readily available, and is not always quoted at the same temperature.

A variety of solvents have been used to dissolve polymer materials for spin coating, including chloroform, benzene and toluene (U.S. Pat. No. 4,749,245), dimethyl cyclohexane (U.S. Pat. No. 4,824,522), methyl isobutyl ketone (MIBK, U.S. Pat. No. 5,062,680), N,N-dimethyl acetamide (DMA, U.S. Pat. No. 6,316,589), 2-methoxy ethyl acetate (U.S. Pat. No. 6,603,917) and ethyl lactate (U.S. Pat. No. 7,030,039). In recent years, cyclopentanone, cyclohexanone and propylene glycol monomethyl ether acetate (PGMEA) have become popular spin coating solvents. Selected boiling point and vapour pressure data for these solvents are presented in Table 1, where available.

TABLE 1

| Solvent | Boiling point at 1 atm pressure (° C.) | Vapour pressure at 20° C. (mmHg) | Temperature at which vapour pressure is 1 mmHg (° C.) |
|---|---|---|---|
| Chloroform | 61.3 | 159 | −58.0 |
| Benzene | 80.1 | 74.6 | −36.7 |
| Toluene | 110.6 | 22 | −26.7 |
| MIBK | 119 | 15 | −1.4 |
| Dimethyl cyclohexane | 124 | not available | not available |
| Cyclopentanone | 130-131 | 11.4 (at 25° C.) | not available |
| 2-methoxy ethyl acetate | 145 | not available | not available |
| PGMEA | 145-146 | 3.7 | not available |
| Ethyl lactate | 154 | 2 | not available |
| Cyclohexanone | 155 | 2 | 1.4 |
| DMA | 164.5-166 | not available | not available |

Since all of these solvents have a boiling point below 175° C., one possible criterion for a liquid material to be "substantially non-volatile" is that it be free from any components boiling at less than 175° C. at 760 mmHg, preferably free from any components boiling at less than 225° C. at 760 mmHg, and most preferably free from any components boiling at less than 275° C. at 760 mmHg. Alternatively, a substantially non-volatile liquid material may be defined as one that has a vapour pressure of less than 0.5 mmHg at 20° C., preferably less than 0.1 mmHg at 20° C., and most preferably less than 0.01 mmHg at 20° C. Alternatively, a substantially non-volatile liquid material may be defined as one whose vapour pressure exceeds 1 mmHg only when the temperature exceeds 25° C., preferably when the temperature exceeds 50° C., and most preferably when the temperature exceeds 75° C.

A limited number of solvent-free polymer waveguide materials are known in the art (see for example Corning's multi-functional acrylates (U.S. Pat. No. 6,555,288) and AlliedSignal's multi-functional vinyl ethers (U.S. Pat. No. 6,308,001)), and their advantages (better film uniformity, no soft-bake step required) for the spin coating of optical quality films have been elaborated by Eldada and Shacklette (L. Eldada and L. W. Shacklette, "Advances in polymer integrated optics", *IEEE Journal of Selected Topics in Quantum Electronics* vol. 6, pp 54-68, 2000). However the use of solvent-free polymers for an extrude-and-spin or any other two-stage deposition process is not known in the art. Significantly, FAStar Ltd, who manufacture state-of-the-art extrusion coating equipment, and who also mention the possible addition of a spinning step, make no mention of solvent-free polymers; all of their patents (including U.S. Pat. No. 6,495,205, U.S. Pat. No. 6,548,115, U.S. Pat. No. 6,319,316 and U.S. Pat. No. 6,540,833) disclose that the material being deposited is solvent-based. Further, polymer optical waveguides have not been fabricated from polymer layers deposited by a two-stage deposition process, irrespective of whether the curable polymer being deposited contains a solvent or not.

Since substantially non-volatile polymers remain in liquid form after deposition, they generally need to be curable by some means such as heat or actinic radiation, preferably UV radiation. Preferably the curing process causes a solubility change that can be exploited with a developing solvent.

A preferred class of solvent-free, UV-curable polymers is siloxane polymers (ie. polymers with an alternating Si—O backbone), preferably synthesised by a condensation reaction as disclosed in U.S. Pat. No. 6,800,724, U.S. Pat. No. 6,818,721 or U.S. Pat. No. 6,965,006, the contents of which are incorporated herein by reference, and preferably containing ethylenically unsaturated substitutents. The ethylenically unsaturated substitutents on UV-curable siloxane polymers may for example be methacrylate groups, styrene groups (as in U.S. Pat. No. 6,727,337, the contents of which are also incorporated herein by reference) or vinyl groups. Alternatively the polymers may contain some other group capable of undergoing polymerisation, such as epoxide groups.

Volatility data for some standard siloxane polymers will now be presented, to demonstrate that siloxane polymers synthesised by the reactions disclosed in U.S. Pat. No. 6,800,724, U.S. Pat. No. 6,818,721 and U.S. Pat. No. 6,965,006 are highly likely to satisfy the "substantially non-volatile" criteria described above in relation to Table 1. The most commonly available siloxane polymers, for which volatility data are available in the literature, are linear methyl-substituted siloxanes, ie. where each silicon atom bears two or three methyl groups. Table 2 presents volatility data for linear methyl-substituted siloxanes with up to eleven silicon atoms (note that "Me" signifies a methyl group, $CH_3$—).

TABLE 2

| Siloxane type | Structure | Molecular weight | Boiling point at 1 atm pressure (° C.) | Temperature at which vapour pressure is 1 mmHg (° C.) | Vapour Pressure at 20° C. (mmHg) |
|---|---|---|---|---|---|
| Tetrasiloxane | Me—(Si(Me$_2$)O)$_3$—SiMe$_3$ | 310.7 | 193.5 | 35.3 | 0.45 |
| Pentasiloxane | Me—(Si(Me$_2$)O)$_4$—SiMe$_3$ | 384.9 | 220.5 | 56.6 | 0.0525 |
| Hexasiloxane | Me—(Si(Me$_2$)O)$_5$—SiMe$_3$ | 459.0 | 245.5 | 73.7 | 0.0075 |
| Octasiloxane | Me—(Si(Me$_2$)O)$_7$—SiMe$_3$ | 607.3 | 290.0 | 105.8 | 0.0003 |
| Nonasiloxane | Me—(Si(Me$_2$)O)$_8$—SiMe$_3$ | 681.5 | 307.5 | 144.0 | not available |
| Decasiloxane | Me—(Si(Me$_2$)O)$_9$—SiMe$_3$ | 755.7 | 314.0 | 160.3 | not available |
| Hendecasiloxane | Me—(Si(Me$_2$)O)$_{10}$—SiMe$_3$ | 829.8 | 322.8 | 175.2 | not available |

Inspection of the boiling point data in Table 2 shows that methyl-substituted siloxanes of even modest chain length, that would generally be regarded as oligomers rather than polymers, have boiling points in excess of 175° C. For the purposes of the present invention, and in contrast to the solvents listed in Table 1 above, these methyl-substituted siloxanes would be regarded as substantially non-volatile. Equally, they would be regarded as substantially non-volatile because they have a vapour pressure of 1 mmHg at temperatures that exceed 20° C. They would also be regarded as substantially non-volatile because they have a vapour pressure of below 0.5 mmHg at 20° C. Indeed once the number of repeat units reaches 5, with a molecular weight of 384.9, the vapour pressure is below 0.1 mmHg. It will be appreciated by those skilled in the art that siloxane based polymers or oligomers with higher molecular weights will have lower vapour pressures. Since siloxane polymers synthesised by routes disclosed in U.S. Pat. No. 6,800,724, U.S. Pat. No. 6,818,721 or U.S. Pat. No. 6,965,006 invariably have molecular weights in excess of 500, and typically above 1000, it is cleat that, as defined in this specification, they will be substantially non-volatile.

Finally, we refer to several instances in the patent literature where siloxane polymers (also known as silicones) are regarded as being non-volatile: U.S. Pat. No. 3,935,133; US 2001/0031269; U.S. Pat. No. 6,685,921; and US 2004/0209784

In one preferred form, the polymer used in the present invention is a siloxane synthesised by a method disclosed in U.S. Pat. No. 6,800,724 involving the steps of acidolysis of a metal alkoxide compound with an acid to produce an intermediate acidolysed solution; and condensation of the intermediate solution in the presence of a metal alkoxide compound to produce the metal alkoxide polymer. Volatile components and/or solvents, where present, are removed prior to use. Generally the metal alkoxide compounds used in the respective acidolysis and condensation steps are different, but they may be the same. Preferably the acidolysis and condensation steps are performed without addition of water. Acid is consumed in the acidolysis reaction. Preferably the metal alkoxide compounds are organically modified. More preferably at least 25% of the metal alkoxide compounds used in the acidolysis and/or condensation steps are organically modified. An organically modified metal alkoxide compound is one that includes at least one metal to carbon bond that is unaffected during acidolysis and condensation steps.

Prefer ably the metal alkoxide compound(s) have the general formula

   (1)

where M is a metal of valence V, n is an integer from 0 to (V−1); R is a short chain alkyl group with 1 to 6 carbon atoms; and R$^1$ is an alkyl or aryl group containing from 1 to 20 carbon atoms. The alkyl or aryl group R$^1$ may have substitutents including species such as alkenyl, allyl, alkacryloxy, acryloxy or epoxy groups, which can be polymerised either photolytically or thermally to form an organic network, as well as halogen, amino, mercapto, cyano, nitro, amido and hydroxy groups. If more than one R$^1$ group is present, the R$^1$ groups may or may not be identical. Preferably at least one of the metal alkoxide compounds should have n greater than zero, that is have at least one M—C bond, and said compounds should make up at least 25% of the total number of metal alkoxide species. Preferably the metal alkoxide compound(s) are alkoxides of silicon, zirconium, titanium, germanium and/or aluminium. Preferably the acid is an inorganic acid such as boric or phosphoric acid or a carboxylic acid such as formic, acetic or oxalic acid. More preferably the acid is of an element that has a glass forming or glass modifying oxide, and has a pKa greater than about 2. Preferably the molar ratio of the acid to the metal alkoxide compound in the acidolysis step is from 1:5 to 10:1. Preferably the acidolysis of the metal alkoxide compound is performed in the presence of a mutual solvent, for example an alcohol such as methanol. Note that this mutual solvent is removed after the polymer has been synthesised, so that the polymer is solvent-free at the time of film deposition.

In another preferred form of the present invention, the polymer is prepared by a process disclosed in U.S. Pat. No. 6,818,721, which comprises reacting together: (A) at least one silicon containing compound having at least one silanol group; and (B) at least one silicon containing compound having at least one —OR group wherein R represents an alkyl group having from 1 to 8 carbon atoms, or an alkoxyalkyl group having from 2 to 8 carbon atoms in the presence of (C) a calcium or magnesium catalyst selected to allow the reaction to proceed and (D) at least one solvent. Volatile components and/or solvents, where present, are removed prior to use. The organosilicon condensate is a siloxane, and most preferably a polysiloxane.

Compounds (A) and (B) may independently be monomeric, dimeric, oligomeric of polymeric compounds. The at least one silicon containing compound (A) is advantageously a silanol having between one and three unsubstituted or substituted hydrocarbon groups having from 1 to 18 carbon atoms, or alternatively may be described as a silanol with between one and from OH groups. A silanol with four OH groups is, in its simplest form silicic acid. Preferably, the silanol is diphenyl silanediol. The silanol may also bear a crosslinkable group, for example, a double bond of the acrylate, methacrylate or styrene type. Another suitable crosslinkable group is an epoxide group.

In one preferred embodiment, the at least one silicon containing compound having at least one —OR group (B) is a monomeric compound with the general formula:

$$G_y Si(OR)_{4-y} \quad (2)$$

wherein y has a value of 0, 1, 2 or 3, G represents a unsubstituted or substituted hydrocarbon group having from 1 to 18 carbon atoms; and R represents an alkyl group having from 1 to 8 carbon atoms or an alkoxyalkyl group having from 2 to 8 carbon atoms. Preferably, the at least one silicon containing compound (B) is an alkoxysilane, which has from one to four alkoxy groups inclusive. Preferably, the alkoxy group (OR) is selected from the group consisting of methoxy, ethoxy, n-propoxy, i-propoxy, n-butoxy, i-butoxy and t-butoxy. Like the silanol, the alkoxy silane may also bear a crosslinkable group, for example, a double bond of the acrylate, methacrylate or styrene type. Another suitable crosslinkable group is an epoxide group. Preferably, the crosslinkable group is on G, but it may be on OR. Note that the solvent (D) is removed after the polymer has been synthesised, so that the polymer is solvent-free at the time of film deposition.

In yet another preferred form of the present invention, as disclosed in U.S. Pat. No. 6,727,337, the siloxane is produced by condensation of one or more silanediols of formula (I) and/or derived precondensates thereof.

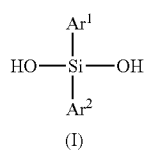
(3)

with one or more silanes of formula (II) and/or derived precondensates thereof.

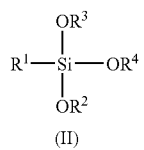
(4)

wherein $Ar^1$ and $Ar^2$ are independently groups with 3 to 20 carbon atoms and at least one aromatic or heteroaromatic group and at least one of $Ar^1$ and $Ar^2$ bears a cross-linkable functional group; and $R^1$, $R^2$, $R^3$ and $R^4$ are independently alkyl, aralkyl or aryl with up to 20 carbon atoms. Preferably the ratio of formula (I) and formula (II) is 1:1. Again, volatile components and/or solvents, where present, are removed prior to use as a coating agent.

Such a polycondensate has the structure

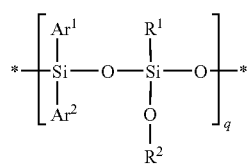
(5)

wherein $Ar^1$ and $Ar^2$ are independently groups with 3 to 20 carbon atoms and at least one aromatic or heteroaromatic group and at least one of $Ar^1$ and $Ar^2$ bears a cross-linkable group; $R^1$ and $R^2$ are independently alkyl, aralkyl or aryl with up to 20 carbon atoms; and q is at least 1 $Ar^1$ and $Ar^2$ may preferably have 5 to 20 carbon atoms.

The photo-curable materials further comprise at least one free radical generating photo-initiator. Examples of commercially available free radical generating photo-initiators suitable for UV light include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino)benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, camphorquinone may be used as a photo-initiator. A mixture of two or more photo-initiators may also be used. For example, Irgacure 1000 is a mixture of 80% Darocur 1173 and 20% Irgacure 184. The photo-initiator may be present at a level from 0.01% to 10% by weight of the overall composition, more preferably from 0.5% to 4% by weight of the overall composition. A liquid photo-initiator is generally preferred, for ease of mixing into the photo-curable material. However certain solid photo-initiators may also be soluble in the photo-curable material, without addition of a solvent.

For thermal curing, organic peroxides in the form of peroxides (eg. dibenzoyl peroxide), peroxydicarbonates, peresters (t-butyl perbenzoate), perketals, hydroperoxides, as well as AIBN (azobisisobutyronitrile), may be used as initiators. Other additives, such as stabilisers, plasticisers, contrast enhancers, dyes or fillers may be added to enhance the properties of the photo-curable polymer as required.

As mentioned above, large area rectangular substrates composed of glass or polymer are routinely used in the flat panel display industry. Accordingly, such substrates are widely available either as pre-packaged panels or on rolls that can be cut to size, so that glass and polymer are preferred over other substrate materials. Polymer substrates may be further preferred on grounds of low cost and light weight, and for certain applications it may be essential to use highly flexible substrates. As described in our co-pending U.S. patent application entitled "Waveguide materials for optical touch screens", Ser. No. 11/742,887, filed on even date and incorporated herein by reference in its entirety, waveguides on highly flexible substrates are desirable for optical touch screens for consumer electronics devices where space is at a premium. A large range of polymer substrates are available, including polyethylene terephthalate (PET), polyethylene naphthalate (PEN), polycarbonate (PC), polyvinyl chloride (PVC), polystyrene (PS), acrylates (such as PMMA) and polyimide (PI), all of which have been used in the flat panel display industry (W. A. McDonald, "Engineered films for display technologies", *Journal of Materials Chemistry* vol. 14, pp 4-10, 2004). Of these, PET is by far the most widely used because it is inexpensive and widely available in large volume (for example as Melinex® or Mylar®), with high surface quality (ie. smoothness). PC is likewise inexpensive and widely available. Another commonly available class of polymers that may serve as a substrate material is polysulfones. Alternatively, the substrate may be a printed circuit board composed of a laminate such as FR-4; such a substrate material may be preferred for waveguides for optical backplanes for example.

The substrate thickness is not particularly important for the present invention, and will be chosen generally on considerations of flexibility, cost, ease of handling and weight. Preferably, the substrate thickness is in the range 0.05 mm to 5 mm, more preferably 0.05 mm to 1 mm, even more preferably 0.1 mm to 0.75 mm, and most preferably about 0.175 mm.

When choosing a polymer substrate/photo-curable polymer combination, certain other factors may need to be considered. For example, as described in our co-pending U.S. patent application entitled "Waveguide materials for optical touch screens", Ser. No. 11/742,887 filed on even date, it is desirable for the photo-curable polymer to have a lower glass transition temperature (Tg) than the polymer substrate, so that strain does not build up in the waveguides. In another example, as described in our co-pending U.S. patent application Ser. No. 11/355,668 entitled "Photolithographic patterning of polymeric materials", incorporated herein by reference in its entirety, for accurate patterning of a UV-curable polymer layer on a polymer substrate, it may be necessary to employ a substrate material containing a UV absorbing species. Substrates may be rigid or flexible, depending upon the requirements of the device and/or the limitations imposed by subsequent manufacturing procedures.

Once a suitable substrate/photo-curable polymer combination has been chosen, an integrated optical waveguide device may in one preferred embodiment be fabricated via a photolithography/wet etch process as illustrated in FIGS. 2a to 2d, with the proviso that at least one of the optical layers be deposited by a two stage process such as extrude-and-spin, using a solvent-free polymer. The process will be described by way of example, to illustrate the fabrication of optical waveguide arrays for optical touch screen sensors. Lower cladding layer 21 and upper cladding layer 27 are both optional, but if present they are preferably composed of photo-curable polymers of similar composition to the polymer used for the light guiding core layer (but with lower refractive index). Since even the highest quality polymer substrates have a much higher density of surface defects than a freshly deposited layer of a photo-curable polymer, to minimise scattering loss it is generally preferred to deposit a lower cladding layer even if the substrate has the appropriate refractive index and low optical absorption at the operating wavelength. For mechanical protection of the patterned light guiding layer, it is also preferred to deposit an upper cladding layer. Each of the lower cladding, core and upper cladding layers, where present, are preferably 0.5 µm to 250 µm in thickness, more preferably 3 µm to 50 µm in thickness, and most preferably 5 µm to 25 µm in thickness.

EXAMPLE 1

In this example, the light guiding core layer is deposited by a two-stage extrude-and-spin process, and the lower cladding and upper cladding layers are each deposited by a single stage extrusion process.

Following the procedure disclosed in U.S. Pat. No. 6,818,721, a lower refractive index polymer. A was prepared with a viscosity of 2500 cP (at 20° C.) and a refractive index (measured at 20° C. on an Abbé refractometer with room light) of 1.483. A higher refractive index polymer B was prepared with a viscosity of 2200 cP (at 20° C.) and a refractive index of 1509 (at 20° C.). A suitable photo-initiator was added to both polymer A and polymer B, without the presence of any solvent.

Figure 5:
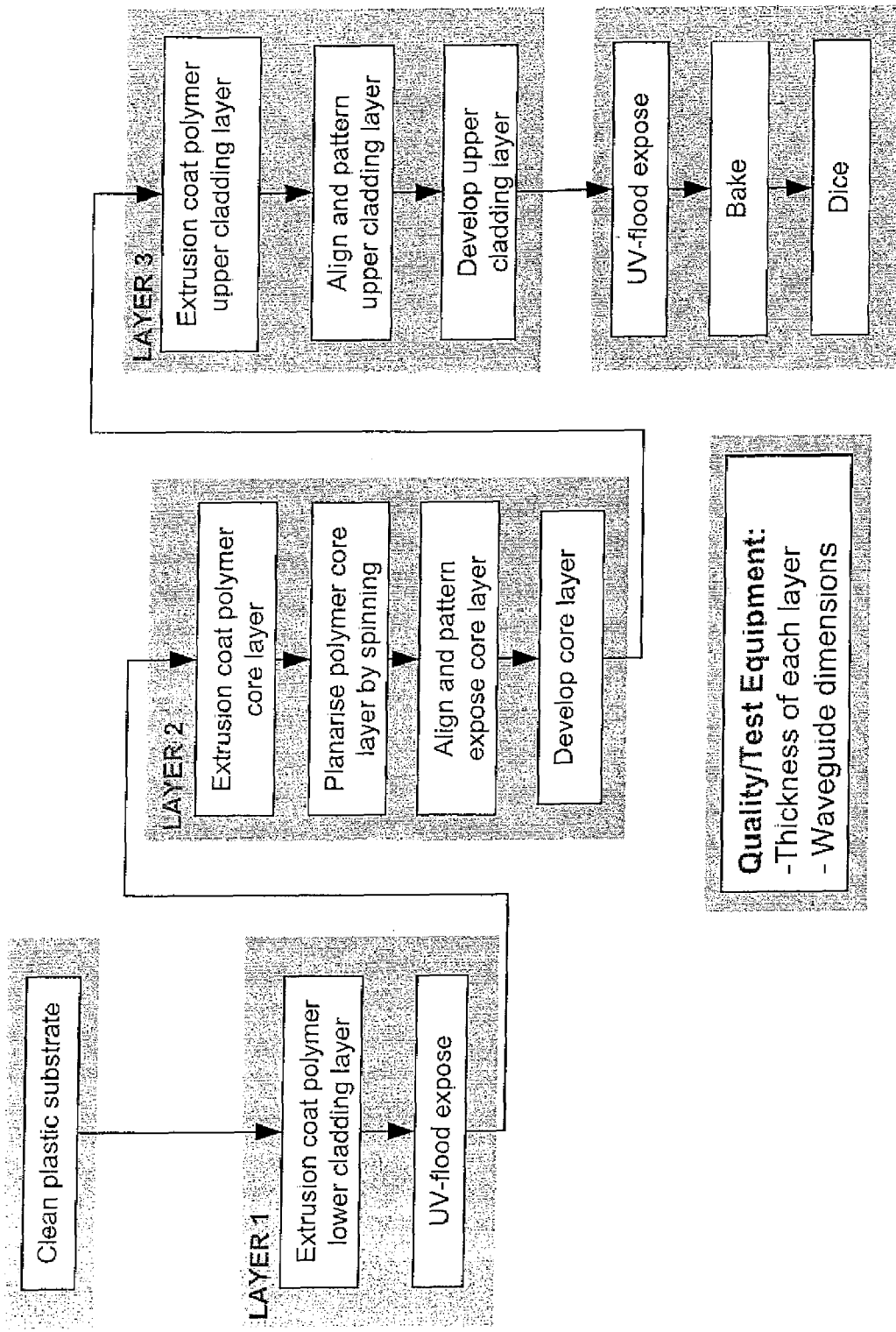
FIG. 5 shows a flowchart summarising the inventive method for the fabrication of optical waveguides on large area substrates.

Once polymers A and B had been obtained, the waveguides were fabricated using a process summarised in the flowchart shown in FIG. 5. A substrate comprising a 0.175 mm thick sheet of the polycarbonate UV® (Bayer, with a co-extruded UV absorbing layer) was cut to the appropriate size (400 mm×500 mm) and cleaned to remove any particulate matter. Polymer A was extrusion coated onto the polycarbonate substrate using an FAStar Advantage III Extrusion Coating System, then blanket cured with UV light from a Tamarack PRX8000 flood illuminator to form a lower cladding layer with thickness 20 µm and refractive index 1.485 (at 20° C. and 850 nm). The blanket UV curing step may be performed in an ambient environment (air) or in a controlled environment (eg. nitrogen or some other gas mixture). Polymer A could alternatively have been deposited by some other technique such as spin coating (although this is not preferred as it is wasteful of material), or a two-stage technique such as extrude-and-spin.

Polymer B was then extruded using the FAStar Advantage III Extrusion Coating System, and the substrate transferred to an SSEC 3400ML spinner where the layer was further planarised (and thinned) by spinning at 1500 rpm for 15 seconds to form a core layer 11 µm thick. This layer was then image-wise exposed to UV light through a mask in a Tamarack model 303 photolithography tool, and developed with isopropanol on a QSSE Optiwet ST60 development tool to leave exposed material in the form of an array of elongated channels. Exposed polymer B material had a refractive index of 1.513 (at 20° C. and 850 nm). Alternatively, the image-wise exposure could be performed with any other photolithography tool such a stepper or scanning system that is used routinely in the semiconductor and/or flat panel display industries. Besides isopropanol, several development solvents are known and used in the art. Most are organic liquids, although aqueous base solutions have also been used.

An upper cladding layer of polymer A was then deposited and blanket cured in a similar manner to the lower cladding layer. Alternatively, the upper cladding layer may be image-wise exposed and developed as for the core layer, to produce a suitably patterned upper cladding layer. As disclosed in our co-pending US patent application No. 2005/0089298A1 entitled "Planar waveguide with patterned cladding and method for producing same", incorporated herein by reference in its entirety, a patterned upper cladding layer may be advantageous for certain waveguide devices, such as the in-plane lenses used to collimate and collect beams of light in an optical touch screen sensor.

The three-layer structure was then subjected to a blanket UV exposure step in an ambient environment (air) or in a controlled environment (eg. nitrogen or some other gas mixture). The final stage of the fabrication process was to bake the panel to remove any residual solvent from the wet development step(s).

EXAMPLE 2

In this example, the lower cladding and core layers are each deposited by a two-stage extrude-and-spin process, and the upper cladding layer deposited by a single stage extrusion process.

Lower refractive index polymer A and higher refractive index polymer B, each with a suitable photo-initiator, and a polycarbonate substrate, were each prepared as described in Example 1. Polymer A was extrusion coated onto the polycarbonate substrate using the FAStar Advantage III extrusion coating system, and the substrate transferred to the SSEC 3400ML spinner where the layer was further planarised by spinning at 1500 rpm for 15 seconds. The layer was then blanket cured with UV light from the Tamarack PRX8000 flood illuminator to form a lower cladding layer.

Polymer B was then extruded using the FAStar Advantage III extrusion coating system, and the substrate transferred to the SSEC 3400ML spinner where the layer was further planarised by spinning at 1500 rpm for 15 seconds to form a core layer 11 µm thick. This layer was then image-wise exposed to UV light through a mask in the Tamarack model 303 photolithography tool, and developed with isopropanol on the QSSE Optiwet ST60 development tool to leave exposed material in the form of an array of elongated channels.

An upper cladding layer of polymer A was then extruded using the FAStar Advantage III extrusion coating system, and blanket cured with UV light from the Tamarack PRX8000 flood illuminator.

EXAMPLE 3

In this example, the lower cladding layer is deposited by a single stage extrusion process, and the core and upper cladding layers are each deposited by a two-stage extrude-and-spin process.

Lower refractive index polymer A and higher refractive index polymer B, each with a suitable photo-initiator, and a polycarbonate substrate, were each prepared as described in Example 1. Polymer A was extrusion coated onto the polycarbonate substrate, and blanket cured with UV light to form a lower cladding layer.

Polymer B was then extruded using the FAStar Advantage III extrusion coating system, and the substrate transferred to the SSEC 3400ML spinner where the layer was further planarised by spinning at 1500 rpm for 15 seconds to form a core layer 11 μm thick. This layer was then image-wise exposed to UV light through a mask, and developed with isopropanol to leave exposed material in the form of an array of elongated channels.

An upper cladding layer was then deposited by extruding polymer A onto the patterned core layer, further planarising it using the SSEC 3400ML spinner, and blanket curing it with UV light.

EXAMPLE 4

In this example, the lower cladding, core and upper cladding layers are each deposited by a two-stage extrude-and-spin process.

Lower refractive index polymer A and higher refractive index polymer B, each with a suitable photo-initiator, and a polycarbonate substrate, were each prepared as described in Example 1 Polymer A was extrusion coated onto the polycarbonate substrate, and the substrate transferred to the SSEC 3400ML spinner where the layer was further planarised by spinning at 1500 rpm for 15 seconds. The layer was then blanket cured with UV light to form a lower cladding layer.

Polymer B was then extruded using the FAStar Advantage III extrusion coating system, and the substrate transferred to the SSEC 3400ML spinner where the layer was further planarised by spinning at 1500 rpm for 15 seconds to form a core layer 11 μm thick. This layer was then image-wise exposed to UV light through a mask, and developed with isopropanol to leave exposed material in the form of an array of elongated channels.

An upper cladding layer was then deposited by extruding polymer A onto the patterned core layer, further planarising it using the SSEC 3400ML spinner, and blanket curing it with UV light.

EXAMPLE 5

In this example, the lower cladding layer is deposited by a two-stage extrude-and-spin process, and the core and upper cladding layers are each deposited by a single stage extrusion process.

Lower refractive index polymer A and higher refractive index polymer B, each with a suitable photo-initiator, and a polycarbonate substrate, were each prepared as described in Example 1. Polymer A was extrusion coated onto the polycarbonate substrate using the FAStar Advantage III extrusion coating system, and the substrate transferred to the SSEC 3400ML spinner where the layer was further planarised by spinning at 1500 rpm for 15 seconds. The layer was then blanket cured with UV light to form a lower cladding layer.

A core layer was then deposited and patterned by extruding polymer B onto the lower cladding layer, image-wise exposing it to UV light through a mask, and developing it with isopropanol to leave exposed material in the form of an array of elongated channels.

An upper cladding layer of polymer A was then extruded onto the patterned core layer and blanket cured with UV light.

EXAMPLE 6

In this example, the lower and upper cladding layers are each deposited by a two-stage extrude-and-spin process, and the core layer deposited by a single stage extrusion process.

Lower refractive index polymer A and higher refractive index polymer B, each with a suitable photo-initiator, and a polycarbonate substrate, were each prepared as described in Example 1. Polymer A was extrusion coated onto the polycarbonate substrate using the FAStar Advantage III extrusion coating system, and the substrate transferred to the SSEC 3400ML spinner where the layer was further planarised by spinning at 1500 rpm for 15 seconds. The layer was then blanket cured with UV light to form a lower cladding layer.

A core layer was then deposited and patterned by extruding polymer B onto the lower cladding layer, image-wise exposing it to UV light through a mask, and developing it with isopropanol to leave exposed material in the form of an array of elongated channels.

An upper cladding layer was then deposited by extruding polymer A onto the patterned core layer, further planarising it using the SSEC 3400ML spinner, and blanket curing it with UV light.

EXAMPLE 7

In this example, the lower cladding and core layers are each deposited by a single stage extrusion process, and upper cladding layer deposited by a two-stage extrude-and-spin process.

Lower refractive index polymer A and higher refractive index polymer B, each with a suitable photo-initiator, and a polycarbonate substrate, were each prepared as described in Example 1. Polymer A was extrusion coated onto the polycarbonate substrate, and blanket cured with UV light to form a lower cladding layer.

A core layer was then deposited and patterned by extruding polymer B onto the lower cladding layer, image-wise exposing it to UV light through a mask, and developing it with isopropanol to leave exposed material in the form of an array of elongated channels.

An upper cladding layer was then deposited by extruding polymer A onto the patterned core layer, further planarising it using the SSEC 3400ML spinner, and blanket curing it with UV light.

In all of the foregoing examples, the core layer was patterned by imagewise exposure to UV light in a photolithography/wet etch process. The following example illustrates an alternative, moulding-based patterning process, where at least one of the optical layers is deposited by a two-stage process such as extrude-and-spin.

EXAMPLE 8

As shown in FIGS. 6a to 6c, a re-usable mould 61 was prepared by spin coating a layer of photoresist 62 onto a 400 mm×500 mm glass sheet 63 and imagewise exposing it to UV light 64 through a mask 65 in a Tamarack 303 photolithography tool Unexposed photoresist was dissolved in isopropanol to produce a master 66 with the desired waveguide pattern. Polydimethylsiloxane (PDMS) was cast onto the master 66, cured and peeled off to form the re-usable mould 61. PDMS is a preferred material for producing the mould, because it has low surface energy (ie. it does not stick to most materials) and is transparent to UV light, enabling UV curing of the material being moulded.

Figure 7B:
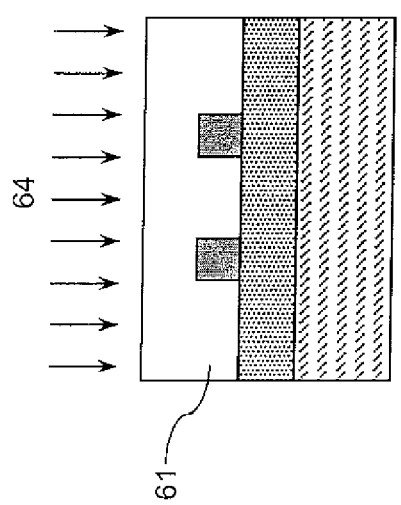
FIGS. 7a to 7d illustrate a method for fabricating an optical waveguide including patterning of a photo-curable polymer via moulding.
Figure 7D:
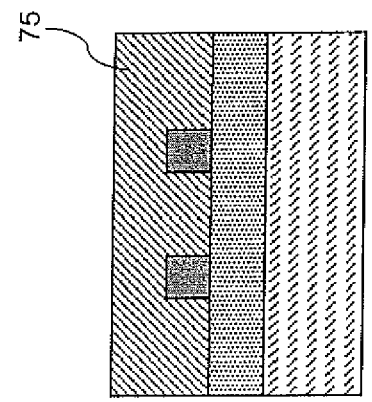
Figure 7A:
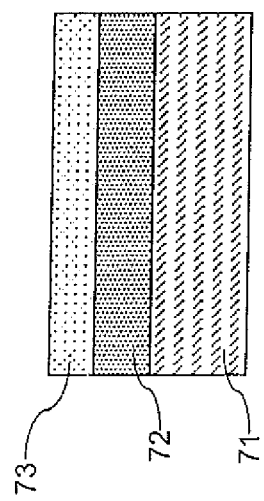
Figure 7C:
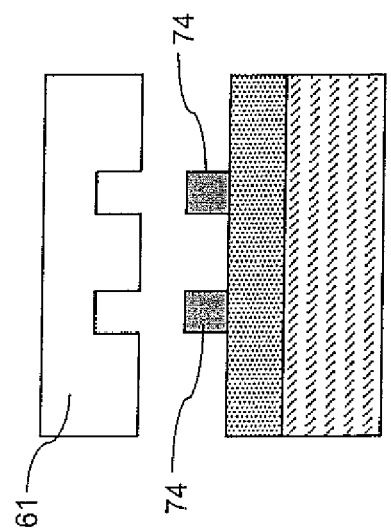

The waveguide fabrication process will now be illustrated with reference to FIGS. 7a to 7d. Lower refractive index polymer A and higher refractive index polymer B were prepared as in Example 1. Polymer A was extruded onto a 400 mm×500 mm×175 µm polycarbonate sheet 71 using a FAStar Advantage III Extrusion Coating System to form a layer 25 µm thick, then transferred to a spinner where it was further planarised (and thinned) by spinning at 1500 rpm for 15 seconds. The planarised film was cured with UV light from a mercury lamp in a Tamarack PRX8000 flood illuminator to form a 20 µm thick lower cladding layer 72. Polymer B was deposited onto the lower cladding layer 72 by an identical extrude-and-spin process to form an 11 µm thick core layer 73. The PDMS mould 61 was then applied to the core layer (as shown in FIG. 7b) and the polymer cured with UV light 64 in the Tamarack PRX8000 flood illuminator, and the PDMS mould peeled off as shown in FIG. 7c, leaving a set of elongated channels (cores) 74. Finally, an upper cladding layer 75 of polymer A was deposited and cured in a similar manner to the lower cladding layer.

It will be appreciated that with the moulding-based waveguide fabrication process of Example 8, one advantage of a two-stage deposition process, viz the production of highly uniform layers (as in spin coating) with minimal wastage of material (as in extrusion coating for example) applies to the lower cladding layer but not to the core layer or the upper cladding layer. This is because the smoothness of the bottom face of a core 74 is determined by the quality of the lower cladding layer 72 whereas the smoothness of the other faces of the core is determined by the moulding process. Nevertheless, the other advantage of the two-stage deposition process described above in relation to FIGS. 3 and 4, viz the efficient use of available substrate area, still applies to all of the optical layers.

Figure 8:
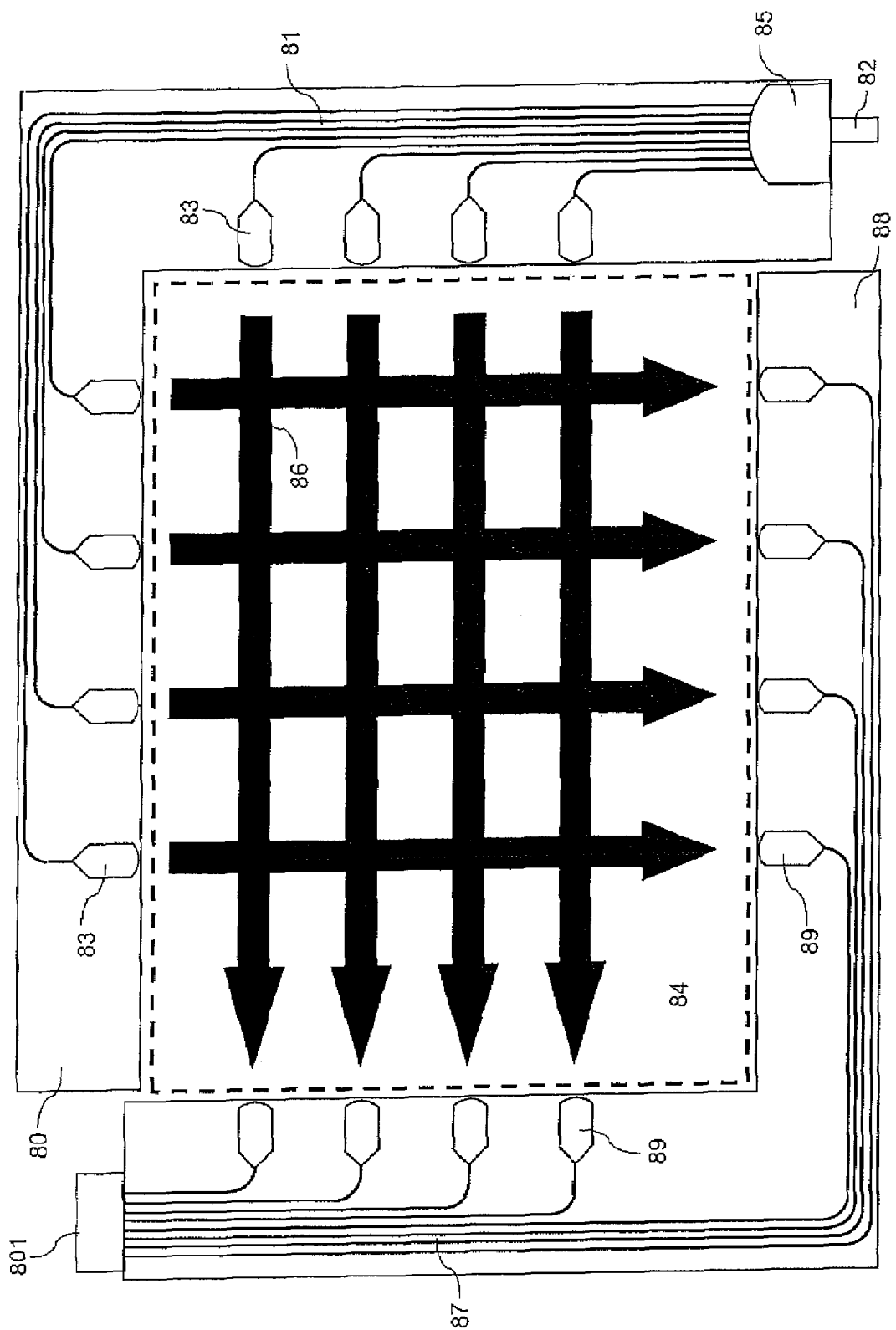
FIG. 8 illustrates the use of two "L" shaped optical waveguide arrays in an optical touch screen sensor.

Irrespective of the waveguide fabrication method, the specific waveguide layout depends on the application. For example, the optical touch screen sensors disclosed in U.S. Pat. No. 5,914,709, U.S. Pat. No. 6,181,842 and U.S. Pat. No. 6,351,260 may require two L-shaped waveguide arrays. As illustrated schematically in FIG. 8, a transmit side "L" 80 may have a plurality of waveguides 81 to guide light from a single optical source 82 to a plurality of lenses 83 spaced along two adjacent sides of a quadrilateral input area 84. The waveguide layout in transmit side "L" 80 also contains a 1×N splitter 85 to distribute the optical power from source 82 into waveguides 81. A two dimensional matrix of light beams 86 emitted from waveguides 81 traverse input area 84 and are collected by a matching plurality of waveguides 87 on a receive side "L" 88 placed along the other two adjacent sides of input area 84, preferably with the aid of a second plurality of lenses 89. Waveguides 87 then guide the collected light to a multi-element detector 801. Apart from the details of the waveguide layout in the vicinity of source 82 and detector 801, transmit side "L" 80 and receive side "L" 88 are essentially identical and occupy the same amount of substrate space. With this sort of touch screen sensor, a touch is detected by the interruption of one or more beams in each of the two axes, and the touch location calculated by identifying the particular interrupted beams. Although for simplicity FIG. 8 only shows four waveguides 81, 87 and lenses 83, 89 along each side of the input area 84, a practical optical touch screen sensor will often have many more waveguides and lenses per side, with the lenses closely spaced. In an alternative embodiment, an optical touch screen sensor may have two optical sources and two multi-element detectors, one pair per axis; in this case four elongated rectangular waveguide arrays are required.

Figure 9:
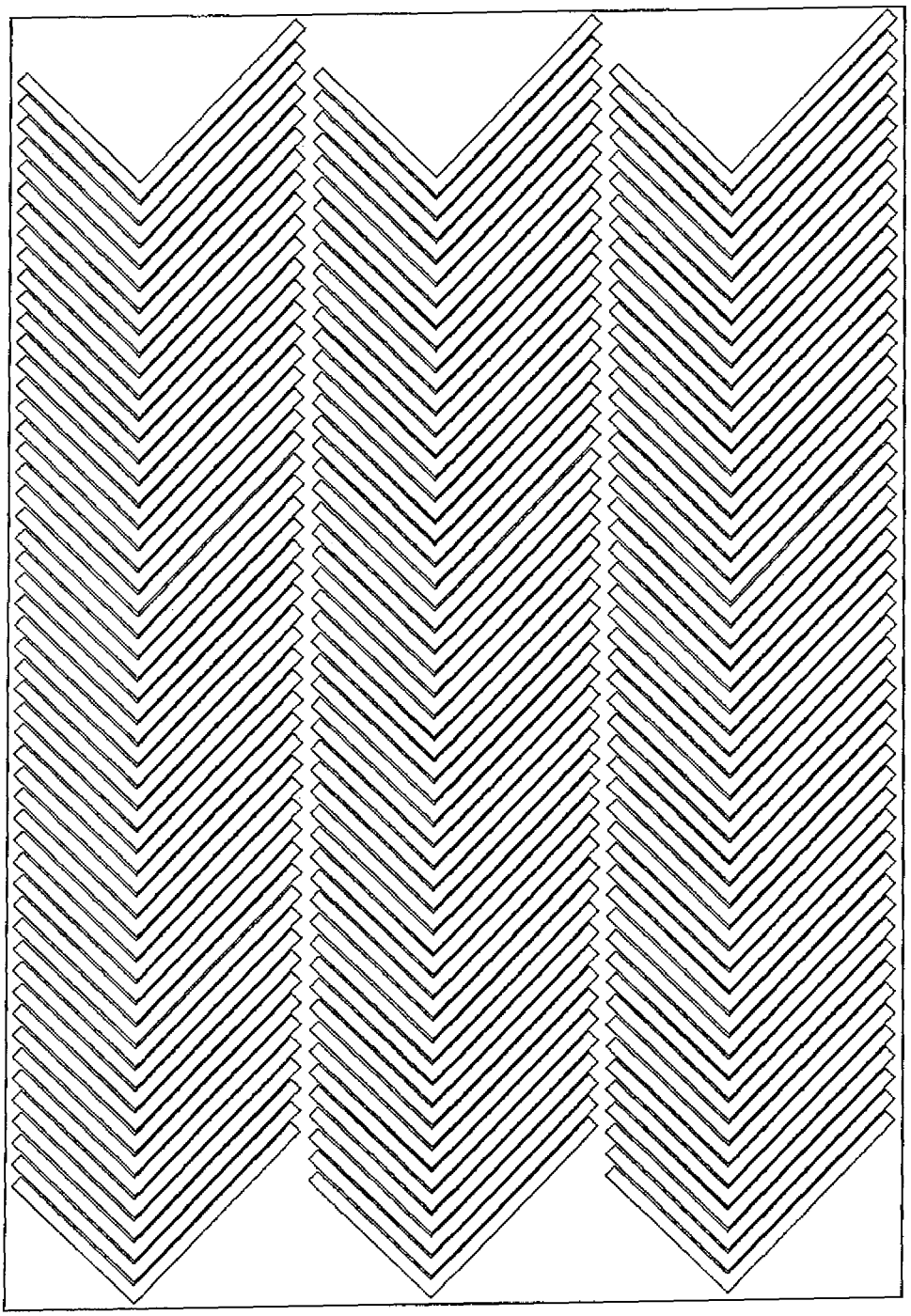
FIG. 9 shows a top view of a panel containing close-packed L-shaped waveguide arrays

FIG. 9 shows a top view of a panel containing close-packed L-shaped waveguide arrays fabricated for example according to the process shown in FIG. 5. These arrays can be singulated (or isolated) from the panel by dicing or by using a laser cutting procedure. The dicing method is generally preferred since it is well established in the art. With the exemplified combination of siloxane polymer waveguides on a polycarbonate substrate, effective dicing can be achieved with a diamond-impregnated blade of 2-3 µm grit size, at a rotational speed of 40,000 rpm and a linear blade speed of 12 mm/s.

The invention has been described by reference to certain preferred embodiments; however it should be understood that it may be embodied in other specific forms or variations thereof without departing from its spirit or essential characteristics. The embodiments described above are therefore considered to be illustrative in all respects and not restrictive, the scope of the invention being defined by the appended claims rather than by the foregoing description.

What we claim is:

1. A method of fabricating a polymer optical waveguide, said method comprising the steps of:

applying a first curable polymer material to a substrate by a process selected from the group consisting of extrusion coating, slot coating, roller coating, meniscus coating, spray coating, curtain coating and doctor blading to produce a layer of the first curable polymer material;

spinning the substrate to improve the thickness uniformity of the layer of the first curable polymer material; and processing the layer to produce a light guiding core, the processing step including curing the first curable polymer material.

2. A method according to claim 1 wherein said processing step comprises the steps of image-wise exposing said layer of first curable polymer material to a patterned source of curing radiation, thereby defining an exposed portion of said layer and an unexposed portion of said layer; and removing said unexposed portion with a solvent.

3. A method according to claim 1 wherein said processing step comprises the steps of:

applying a mould to said layer of first curable polymer material;

exposing said material to curing radiation; and removing said mould.

4. A method according to claim 1 wherein said first curable polymer material is applied to said substrate by extrusion coating.

5. A method according to claim 1 wherein said first curable polymer material is curable by means selected from a group comprising actinic radiation and heat.

6. A method according to claim 5 wherein said actinic radiation is UV radiation.

7. A method according to claim 1 wherein said first curable polymer material is substantially non-volatile.

8. A method according to claim 1 wherein said first curable polymer material is solvent-free.

9. A method according to claim 1 wherein said first curable polymer material has a viscosity in the range 100-10,000 cP, preferably in the range 500-5,000 cP, and most preferably in the range 1,000-4,000 cP.

10. A method according to claim 1 wherein said layer of said first curable polymer material has a thickness uniformity better than 4%, preferably better than 2%, and more preferably better than 0.5%.

11. A method according to claim 1 wherein said first curable polymer material, when cured, has a glass transition temperature (Tg) below an operating temperature of said polymer optical waveguide.

12. A method according to claim 1 wherein said first curable polymer material, when cured, has a Tg below 50° C., more preferably below 25° C., and most preferably below 10° C.

13. A method according to claim 1 wherein said polymer optical waveguide forms a component of a device selected from the group comprising an optical backplane, a telecommunications system, a data communications system, and a waveguide-based optical touch screen sensor.

14. A method according to claim 1 wherein said substrate comprises a circular wafer of up to 300 mm in diameter, comprising a material selected from the group comprising silicon, oxidised silicon, gallium arsenide, indium phosphide, sapphire, a ceramic, a glass and a polymer.

15. A method according to claim 1 wherein said substrate comprises a rectangular panel of at least 200 mm×200 mm, and preferably at least 270 mm×300 mm in size, comprising a material selected from the group comprising a glass, a polymer and a laminate such as FR-4.

16. A method according to claim 15 wherein said rectangular panel comprises a polymer selected from the group comprising polycarbonate, polymethyl methacrylate, polyester, polyethylene, polyimide, polystyrene, nylon, polyvinyl chloride and polysulfone.

17. A method according to claim 16 wherein said first curable polymer material, when cured, has a Tg less than a Tg of said rectangular panel.

18. A method according to claim 1 additionally comprising the step of applying to said substrate a lower cladding layer prior to applying said first curable polymer material, wherein said lower cladding layer has a refractive index lower than a refractive index of said light guiding core.

19. A method according to claim 18 wherein said lower cladding layer comprises a second curable polymer material, and additionally comprising the step of blanket curing said second curable polymer material after it has been applied.

20. A method according to claim 18 wherein said lower cladding layer is applied by a process selected from the group comprising spin coating, extrusion coating, slot coating, roller coating, meniscus coating, curtain coating, spray coating and doctor blading.

21. A method according to claim 18 wherein said lower cladding layer is applied by a two-stage technique comprising:
a process selected from the group comprising extrusion coating, slot coating, roller coating, meniscus coating, curtain coating, spray coating and doctor blading, followed by a spinning process.

22. A method according to claim 19 wherein said second curable polymer material is curable by means selected from a group comprising actinic radiation and heat.

23. A method according to claim 22 wherein said actinic radiation is UV radiation.

24. A method according to claim 19 wherein said second curable polymer material is substantially non-volatile.

25. A method according to claim 19 wherein said second curable polymer material, when cured, has a Tg below 50° C., more preferably below 25° C., and most preferably below 10° C.

26. A method according to claim 19 wherein said substrate has a Tg and said second curable polymer material, when cured, has a Tg less than the Tg of said substrate.

27. A method according to claim 18 wherein said lower cladding layer and said light guiding core are of substantially similar but non-identical composition.

28. A method according to claim 1 additionally comprising the step of applying to said light guiding core an upper cladding layer, wherein said upper cladding layer has a refractive index lower than a refractive index of said core.

29. A method according to claim 28 wherein said upper cladding layer comprises a third curable polymer material, and additionally comprising the step of blanket curing said third curable polymer material after it has been applied.

30. A method according to claim 28 wherein said upper cladding layer is applied by a process selected from the group comprising spin coating, extrusion coating, slot coating, roller coating, meniscus coating, curtain coating, spray coating and doctor blading.

31. A method according to claim 28 wherein said upper cladding layer is applied by a two-stage technique comprising:
a process selected from the group comprising extrusion coating, slot coating, roller coating, meniscus coating, curtain coating, spray coating and doctor blading, followed by a spinning process.

32. A method according to claim 29 wherein said third curable polymer material is curable by means selected from the group comprising actinic radiation and heat.

33. A method according to claim 32 wherein said actinic radiation is UV radiation.

34. A method according to claim 29 wherein said third curable polymer material is substantially non-volatile.

35. A method according to claim 28 wherein said upper cladding layer and said light guiding core are of substantially similar but non-identical composition.

36. A method according to claim 28, wherein said upper cladding layer comprises a third curable polymer material, and additionally comprising the step of patterning said third curable polymer material.

37. A method according to claim 28 wherein said upper cladding layer is applied by a process selected from the group comprising spin coating, extrusion coating, slot coating, roller coating, meniscus coating, curtain coating, spray coating and doctor blading.

38. A method according to claim 28 wherein said upper cladding layer is applied by a two-stage technique comprising:
a process selected from the group comprising extrusion coating, slot coating, roller coating, meniscus coating, curtain coating, spray coating and doctor blading, followed by a spinning process.

39. A method according to claim 36 wherein said third curable polymer material is curable by means selected from the group comprising actinic radiation and heat.

40. A method according to claim 39 wherein said actinic radiation is UV radiation.

41. A method according to claim 36 wherein said third curable polymer material is substantially non-volatile.

42. A method according to claim 36 wherein said third curable polymer material, when cured, has a Tg below 50° C., more preferably below 25° C., and most preferably below 10° C.

43. A method according to claim wherein said substrate has a Tg and said third curable polymer material, when cured, has a Tg less than the Tg of said substrate.

44. A method of fabricating a polymer optical waveguide, said method comprising the steps of:
applying a second curable polymer material to a substrate by a process selected from the group consisting of extrusion coating, slot coating, roller coating, meniscus coating, spray coating, curtain coating and doctor blading to produce a layer of the second curable polymer material;
spinning the substrate to improve the thickness uniformity of the layer of the second curable polymer material;
blanket curing the layer of the second curable polymer material to form a lower cladding layer having a second refractive index;
applying a first curable polymer material to the lower cladding layer by a process selected from the group consisting of extrusion coating, slot coating, roller coating, meniscus coating, spray coating, curtain coating and doctor blading to produce a layer of the first curable polymer material;
spinning the substrate to improve the thickness uniformity of the layer of the first curable polymer material; and
processing the first curable polymer material to produce a light guiding core, the processing step including curing the first curable polymer material, wherein the core has a first refractive index higher than the second refractive index.

45. A method according to claim 44 wherein said processing step comprises the steps of:
image-wise exposing said first curable polymer material to a patterned source of curing radiation, thereby defining an exposed portion of said material and an unexposed portion of said material; and
removing said unexposed portion with a solvent.

46. A method according to claim 44 wherein said processing step comprises the steps of:
applying a mould to said first curable polymer material;
exposing said material to curing radiation; and
removing said mould.

47. A method according to claim 44 wherein at least one of said first and second curable polymer materials is applied by extrusion coating.

48. A method according to claim 44 wherein said first and second curable polymer materials are cured with UV radiation.

49. A method according to claim 44 additionally comprising the step of applying to said light guiding core an upper cladding layer, wherein said upper cladding layer has a refractive index lower than said first refractive index.

50. A method according to claim 49 wherein said upper cladding layer comprises a third curable polymer material, and additionally comprising the step of blanket curing said material after it has been applied.

51. A method according to claim 49 wherein said upper cladding layer is applied by a process selected from the group comprising spin coating, extrusion coating, slot coating, roller coating, meniscus coating, curtain coating, spray coating and doctor blading.

52. A method according to claim 49 wherein said upper cladding layer is applied by a two-stage technique comprising:
a process selected from the group comprising extrusion coating, slot coating, roller coating, meniscus coating, curtain coating, spray coating and doctor blading, followed by a spinning process.

53. A method according to claim 50 wherein said third curable polymer material is cured with UV radiation.

54. A method according to claim 44 further including the step of spinning said substrate after applying said first curable polymeric material to obtain a layer of said first curable polymer material with substantially uniform thickness.

55. A method of fabricating a polymer optical waveguide, said method comprising the steps of
applying a second curable polymer material to a substrate by a process selected from the group consisting of extrusion coating, slot coating, roller coating, meniscus coating, spray coating, curtain coating and doctor blading to produce a layer of the second curable polymer material;
spinning the substrate to improve the thickness uniformity of the layer of the second curable polymer material;
blanket curing the layer of the second curable polymer material to form a lower cladding layer having a second refractive index;
applying a first curable polymer material to the lower cladding layer by a process selected from the group consisting of extrusion coating, slot coating, roller coating, meniscus coating, spray coating, curtain coating and doctor blading to produce a layer of the first curable polymer material;
spinning the substrate to improve the thickness uniformity of the layer of the first curable polymer material;
processing the first curable polymer material to produce a light guiding core, the processing step including curing the first curable polymer material, wherein the core has a first refractive index higher than the second refractive index;
applying a third curable polymer material to the polymer optical waveguide by a process selected from the group consisting of extrusion coating, slot coating, roller coating, meniscus coating, spray coating, curtain coating and doctor blading to produce a layer of the third curable polymer material;
spinning the substrate to improve the thickness uniformity of the layer of the third curable polymer material; and
blanket curing the layer of third curable polymer material to form an upper cladding layer having a third refractive index, lower than the first refractive index.

56. A method according to claim 55 wherein said processing step comprises the steps of:
image-wise exposing said first curable polymer material to a patterned source of curing radiation, thereby defining an exposed portion of said material and an unexposed portion of said material; and
removing said unexposed portion with a solvent.

57. A method according to claim 55 wherein said processing step comprises the steps of:
applying a mould to said first curable polymer material;
exposing said material to curing radiation; and
removing said mould.

58. A method according to claim 55 wherein at least one of said first, second and third curable polymer materials is applied by extrusion coating.

59. A method according to claim 55 wherein said first, second and third curable polymer materials are cured with UV radiation.

* * * * *